(12) United States Patent
Ide et al.

(10) Patent No.: US 11,318,447 B2
(45) Date of Patent: May 3, 2022

(54) COMPOSITIONS FOR HIGH TEMPERATURE CATALYSIS

(71) Applicant: ExxonMobil Research and Engineering Company, Annandale, NJ (US)

(72) Inventors: Matthew S. Ide, Doylestown, PA (US); Changmin Chun, Raritan, NJ (US); Anastasios I. Skoulidas, Pittstown, NJ (US)

(73) Assignee: ExxonMobil Research and Engineering Company, Annandale, NJ (US)

(*) Notice: Subject to any disclaimer, the term of this patent is extended or adjusted under 35 U.S.C. 154(b) by 250 days.

(21) Appl. No.: 16/512,752

(22) Filed: Jul. 16, 2019

(65) Prior Publication Data

US 2020/0030779 A1   Jan. 30, 2020

Related U.S. Application Data

(60) Provisional application No. 62/712,142, filed on Jul. 30, 2018.

(51) Int. Cl.
*B01J 23/78* (2006.01)
*B01J 21/04* (2006.01)
(Continued)

(52) U.S. Cl.
CPC ............ *B01J 23/78* (2013.01); *B01J 12/007* (2013.01); *B01J 21/04* (2013.01); *B01J 23/94* (2013.01);
(Continued)

(58) Field of Classification Search
CPC . B01J 12/007; B01J 21/04; B01J 23/78; B01J 35/0066
See application file for complete search history.

(56) References Cited

U.S. PATENT DOCUMENTS 7,815,873 B2   10/2010   Sankaranarayanan et al.
8,754,276 B2    6/2014   Buchanan et al.
(Continued)

FOREIGN PATENT DOCUMENTS

WO   2007079030 A2   12/2007
WO   2018213111 A1   11/2018

OTHER PUBLICATIONS

The International Search Report and Written Opinion for PCT/US2019/041941 dated Oct. 23, 2019.

*Primary Examiner* — Paul A Wartalowicz
(74) *Attorney, Agent, or Firm* — Liza Negron

(57) ABSTRACT

Ceramic compositions with catalytic activity are provided, along with methods for using such catalytic ceramic compositions. The ceramic compositions correspond to compositions that can acquire increased catalytic activity by cyclic exposure of the ceramic composition to reducing and oxidizing environments at a sufficiently elevated temperature. The ceramic compositions can be beneficial for use as catalysts in reaction environments involving swings of temperature and/or pressure conditions, such as a reverse flow reaction environment. Based on cyclic exposure to oxidizing and reducing conditions, the surface of the ceramic composition can be converted from a substantially fully oxidized state to various states including at least some dopant metal particles supported on a structural oxide surface.

20 Claims, 8 Drawing Sheets

(51) Int. Cl.
    *B01J 23/94*     (2006.01)
    *B01J 38/02*     (2006.01)
    *B01J 37/16*     (2006.01)
    *B01J 38/12*     (2006.01)
    *B01J 35/00*     (2006.01)
    *C01B 3/40*     (2006.01)
    *B01J 12/00*     (2006.01)
    *B01J 35/04*     (2006.01)

(52) U.S. Cl.
CPC ........... *B01J 35/0066* (2013.01); *B01J 35/04* (2013.01); *B01J 37/16* (2013.01); *B01J 38/02* (2013.01); *B01J 38/12* (2013.01); *C01B 3/40* (2013.01); *C01B 2203/0233* (2013.01); *C01B 2203/0238* (2013.01); *C01B 2203/1023* (2013.01); *C01B 2203/1058* (2013.01); *C01B 2203/1082* (2013.01); *C01B 2203/1241* (2013.01)

(56) References Cited

U.S. PATENT DOCUMENTS

| | | | |
|---|---|---|---|
| 2003/0007926 A1 | 1/2003 | Jiang et al. | |
| 2010/0304236 A1* | 12/2010 | Ying | B01J 23/83 |
| | | | 429/423 |
| 2017/0137285 A1 | 5/2017 | Ide et al. | |

\* cited by examiner

COMPOSITIONS FOR HIGH TEMPERATURE CATALYSIS

CROSS-REFERENCE TO RELATED APPLICATIONS

This application claims priority to U.S. Provisional Application No. 62/712,142 filed Jul. 30, 2018, which is herein incorporated by reference in its entirety.

FIELD

This invention relates to compositions suitable for use as catalytic monoliths in high temperature environments.

BACKGROUND

Reverse flow reactors are an example of a reactor type that is beneficial for use in processes with cyclic reaction conditions. For example, due to the endothermic nature of reforming reactions, additional heat needs to be introduced on a consistent basis into the reforming reaction environment. Reverse flow reactors can provide an efficient way to introduce heat into the reaction environment. After a portion of the reaction cycle used for reforming or another endothermic reaction, a second portion of the reaction cycle can be used for combustion or another exothermic reaction to add heat to the reaction environment in preparation for the next reforming step. U.S. Pat. Nos. 7,815,873 and 8,754,276 provide examples of using reverse flow reactors to perform various endothermic processes in a cyclic reaction environment.

Endothermic reactions such as reforming can also benefit from having a substantial amount of available catalytic surface area. Ceramic monolith structures are an example of a type of structure that can provide a high available surface area. One option can be to use a monolith corresponding to a packed array of cells or channels that the reactant gases pass through. Typically such monoliths are made of a single composition, such as alumina. Washcoats are added to such monoliths to provide catalytic activity.

SUMMARY

In various aspects, methods for reforming a hydrocarbon-containing stream are provided. The methods include exposing an initial composition comprising 0.1 wt % or more of at least one dopant metal oxide and 50 wt % to 99 wt % of one or more structural oxides to a reducing environment. The reducing environment can include a temperature of 500° C. to 1400° C. This can result in formation of a catalyst composition comprising dopant metal particles supported on the one or more structural oxides. The one or more dopant metals can correspond to dopant metal oxides having a Gibbs free energy of formation at 800° C. that is greater than a Gibbs free energy of formation at 800° C. for the one or more structural oxides by 200 kJ/mol or more. Optionally, the particles of the one or more dopant metals can have an average characteristic length of 10 μm or less. The dopant metal oxide can correspond to an oxide of Ni, Rh, Ru, Pd, Pt, Ir, or a combination thereof. The catalyst composition can then be exposed to an oxidizing environment including a temperature of 500° C. to 1400° C. A hydrocarbon-containing stream can then be exposed to the catalyst composition in the presence of at least one of $H_2O$ and $CO_2$ under reforming conditions comprising a temperature of 500° C. or more to form a reformed product comprising $H_2$.

The exposing the hydrocarbon-containing stream to the catalyst composition can be performed after the exposing the catalyst composition to the oxidizing environment. The catalyst composition can then be exposed to a stream comprising fuel and 0.1 vol % or more of $O_2$ under combustion conditions to heat an environment for the catalytic composition to a temperature of 500° C. or more.

Additionally or alternately, in various aspects a method for reforming a hydrocarbon-containing stream is provided. The method can include introducing a hydrocarbon-containing stream into a first end of a reactor. The reactor can include a monolith that includes a catalyst composition. The catalyst composition can correspond to 0.1 wt % or more of dopant metal particles supported on 50 wt % to 99 wt % of one or more structural oxides. The one or more dopant metals can correspond to dopant metal oxides having a Gibbs free energy of formation at 800° C. that is greater than a Gibbs free energy of formation at 800° C. for the one or more structural oxides by 200 kJ/mol or more. Optionally, the particles of the one or more dopant metals having an average characteristic length of 10 μm or less. The dopant metal oxide can correspond to an oxide of Ni, Rh, Ru, Pd, Pt, Ir, or a combination thereof. The hydrocarbon-containing stream can be exposed to the catalyst composition in the presence of at least one of $H_2O$ and $CO_2$ under reforming conditions comprising a temperature of 800° C. or more to form a reformed product comprising $H_2$. At least a portion of the reformed product can be withdrawn from a first location different from the first end of the reactor. A regeneration stream including fuel and a stream including $O_2$ can then be introduced into the reactor. At least a portion of the stream comprising fuel and/or the stream comprising $O_2$ can be introduced into a second end of the reactor. The stream comprising fuel and the stream comprising oxygen can then be combusted under combustion conditions to form a combustion product stream. The combustion product stream can be exposed to the catalyst composition to transfer heat to the catalyst composition. At least a portion of the combustion product stream can then be withdrawn from the reactor.

In some aspects, the particles of one or more dopant metals can correspond to 1.0 wt % or more of Ni particles. Additionally or alternately, the one or more structural oxides can correspond to $Al_2O_3$. In such aspects, the catalytic composition can optionally further include NiO, $NiAl_2O_4$, or a combination thereof.

DETAILED DESCRIPTION OF THE EMBODIMENTS

Figure 1:
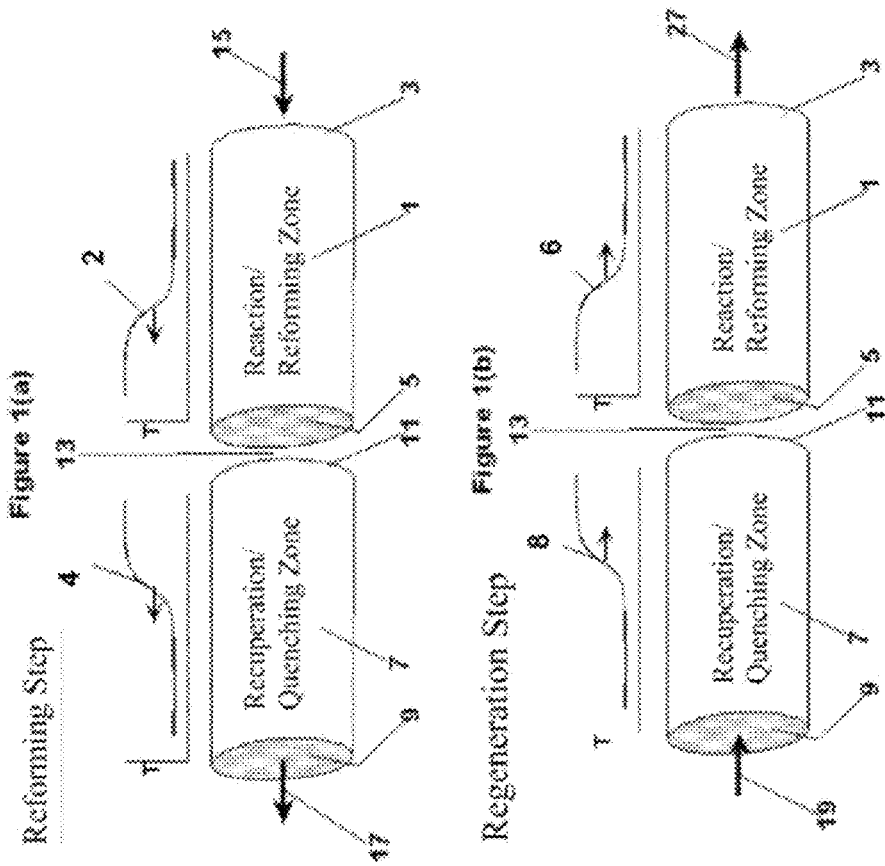
FIG. 1 schematically shows an example of operation of a reverse flow reactor.

All numerical values within the detailed description and the claims herein are modified by "about" or "approximately" the indicated value, and take into account experimental error and variations that would be expected by a person having ordinary skill in the art.

Overview

In various aspects, ceramic compositions with catalytic activity are provided, along with methods for using such catalytic ceramic compositions. The ceramic compositions correspond to compositions that can acquire increased catalytic activity by cyclic exposure of the ceramic composition to reducing and oxidizing environments at a sufficiently elevated temperature. The ceramic compositions can be beneficial for use as catalysts in reaction environments involving swings of temperature and/or pressure conditions. For example, a ceramic composition formed from starting materials including nickel oxide and aluminum oxide can provide catalytic activity for reforming in a reverse flow reforming reaction environment. Based on cyclic exposure to oxidizing and reducing conditions, the surface of the ceramic composition can be converted from a substantially fully oxidized state, such as a combination of oxides including $NiAl_2O_4$ and $Al_2O_3$, to various states including at least some Ni metal supported on a surface including $Al_2O_3$.

In contrast to conventional monoliths, the compositions described herein can include a plurality of components, so that the composition corresponds to a doped ceramic composition. The ceramic composition can include at least one dopant oxide and one or more structural oxides that are thermodynamically more stable than the dopant oxide(s). The dopant oxide(s) can correspond to an oxide of the catalytic metal(s). After forming and sintering the ceramic composition, the ceramic composition can be exposed to reducing conditions. Under the reducing conditions, a portion of the dopant oxide at the surface of the composition can be unexpectedly converted to the dopant metal particles. This is a surprising outcome that can be achieved by selecting the dopant oxide to be thermodynamically less stable (i.e., smaller magnitude Gibbs free energy of formation) than the structural oxide(s) in the composition. Because the Gibbs free energy of formation for dopant oxides and structural oxides is a negative value, the Gibbs free energy of formation for a dopant oxide is greater (less negative) than the Gibbs free energy of formation for a structural oxide. If only reducing conditions are used, however, the dopant metal particles can quickly deactivate. Without being bound by any particular theory, it is believed that this deactivation is due in part to the tendency of the dopant metal particles to coalesce to form rather large metal particles. By subsequently exposing the catalytic composition (including the dopant metal particles) to oxidizing conditions on a periodic or cyclic basis, the dopant metal particles can unexpectedly provide catalytic activity on an ongoing basis. It is believed that part of the unexpected activity is due to cycling between oxidizing and reducing conditions, which can reduce or minimize the tendency of the dopant metal particles to coalesce.

After metal particles are formed, it is noted that cycling between oxidizing and reducing conditions can potentially provide ongoing oxidation and reduction of the metal particles. Thus, after forming metal particles in an initial reducing step, a subsequent oxidation step can partially oxidize at least a portion of the metal particles. The resulting metal oxide particles can then be at least partially reduced to metal particles in a subsequent reducing step.

In some aspects, the porosity of the monolith material can be sufficient so that substantially all of the monolith can be converted to dopant metal particles and structural oxides/other structural materials. Depending on the porosity of the monolith material and the thickness of the cell walls, the monolith can be substantially converted during the initial reducing step, or the conversion of substantially all of the monolith can occur over the course of a plurality of oxidizing/reducing cycles. In aspects where a plurality of oxidizing and reducing cycles are needed to convert additional portions of the monolith to dopant metal particles and structural oxides (and optionally structural materials), a first portion of dopant metal particles can form during an initial reducing step while additional portions (such as a second portion, third portion, etc.) of dopant metal particles can form in subsequent reducing steps. These additional metal particles can also undergo cyclic oxidation and reducing upon continued exposure to the cyclic process conditions.

In addition to providing catalytic activity, in some aspects the ceramic composition including a plurality of components can provide an increased heat capacity relative to conventional single component monoliths. Optionally, additional materials can be included in the ceramic composition, such as silica-containing materials, to provide additional stability and/or additional heat capacity for the composition. In various aspects, the volumetric heat capacity of the monolith material can be 1.4 $J/cm^3$ or more, or 1.7 $J/cm^3$ or more, or 2.0 $J/cm^3$ or more, or 2.2 $J/cm^3$ or more. Higher volumetric heat capacities are generally favorable, so the volumetric heat capacity can be as large as desired, such as up to 6.0 $J/cm^3$ or more.

More generally, a monolith formed from a ceramic composition that has catalytic activity can be used in a wide variety of reaction environments that include both reducing and oxidizing conditions at temperatures between 500° C. and 1400° C. A possible but not exhaustive list of chemistries include water gas shift (WGS), oxidative paraffin coupling, paraffin dehydrogenation to olefins, oxidative dehydrogenation of paraffins to olefins, methane/ethane dehydrogenation to aromatics, selective ammonia oxidation to NO, ammonia synthesis, hydrogen cyanide production, methanol oxidation to formaldehyde, catalytic combustion, solid oxide fuel cells, and combinations thereof.

In order to prepare a composition for introduction into a reactor (i.e., the reactor where the cyclic reaction environment will be provided), a ceramic composition can be formed into any convenient shape. One option can be to extrude or otherwise form a monolith from the ceramic composition. In some aspects, a monolith can include a large plurality of cells or passages that reactant gases can pass through. Because the composition itself can provide catalytic activity, the composition can potentially be used without a washcoat. This can allow smaller cell sizes to be used and/or a higher density of cells (such as higher cells per square inch) while still maintaining a desirable pressure drop across the monolith. Conventionally, addition of a washcoat to a monolith can reduce the available cross-section within a cell for passage of gases. In order to account for this, conventional monolith structures are designed with cell sizes large enough to accommodate the presence of a washcoat while still maintaining a desirable pressure drop. In various aspects, because the composition provides catalytic activity after exposure to the cyclic reaction environment, a washcoat is not necessary for a monolith formed from the composition. This can allow a monolith to be formed with a higher density of cells and/or smaller cells while still providing desirable flow conditions for the gas phase reactants.

In other aspects, a washcoat can be used in combination with the composition to provide a monolith (or other catalytic structure) with further enhanced activity.

Composition Prior to Exposure to Reducing Environment

In various aspects, the ceramic composition can include at least one dopant oxide and one or more structural oxides that are thermodynamically more stable than the dopant oxide. At least one of the oxides in the ceramic composition corresponds to a dopant oxide. The metal (or metals) of the dopant oxide(s) corresponds to the metal that will be reduced during exposure to the reducing conditions to form metal particles on the ceramic surface. To achieve this, the dopant can be selected to be less thermodynamically stable than the structural oxide(s) present in the composition. In this discussion, a dopant oxide with a lower thermodynamic stability than a structural oxide corresponds to a dopant oxide with a smaller magnitude for the Gibbs free energy of formation ($\Delta G$) at a temperature of 800° C. and in the presence of oxygen. Such combinations of dopant oxides and structural oxides can be identified, for example, using an Ellingham diagram.

In various aspects, suitable combinations of dopant oxides and structural oxides can correspond to any combination where the difference of the Gibbs free energy of formation of the dopant oxide and the structural oxide oxides is greater than 200 kJ/mol at a temperature of 800° C., or greater than 300 kJ/mol, or greater than 400 kJ/mol. As a non-limiting example, the Gibbs free energy of formation of NiO from Ni is ~−300 kJ/mol at 800° C. and the Gibbs free energy of formation of $Al_2O_3$ from Al is ~−900 kJ/mol at 800° C. Since the difference in Gibbs free energy of formation is roughly 600 kJ/mol, NiO and $Al_2O_3$ can be a suitable combination of a dopant oxide and a structural oxide. As another non-limiting example, the Gibbs free energy of formation of CoO from Co is ~−300 kJ/mol at 800° C. and the Gibbs free energy of formation of $TiO_2$ from Ti is ~−700 kJ/mol at 800° C. Since the difference in Gibbs free energy of formation is roughly 400 kJ/mol, CoO and $TiO_2$ can be a suitable combination of a dopant oxide and a structural oxide. As yet another non-limiting example, the Gibbs free energy of formation of $Fe_2O_3$ from Fe is ~−200 kJ/mol at 800° C. and the Gibbs free energy of formation of $SiO_2$ from Si is ~−700 kJ/mol at 800° C. Since the difference in Gibbs free energy of formation is roughly 500 kJ/mol, $Fe_2O_3$ and $SiO_2$ can be a suitable combination of a dopant oxide and a structural oxide.

In the ceramic composition, the metal of the structural oxide can be present in an excess molar amount relative to the amount of dopant. In some aspects, this can correspond to having a greater number of moles of the metal(s) of the structural oxide relative to the metal(s) of the dopant oxide.

In other aspects, a dopant oxide and a structural oxide can form a combined oxide phase. For example, in an example where NiO is a dopant oxide and $Al_2O_3$ is a structural oxide, the dopant oxide and structural oxide can combine to form nickel aluminate ($NiAl_2O_4$). When such a combined oxide phase can be formed from the dopant oxide and the structural oxide, the molar amount of the metal in the structural oxide can be present in an excess molar amount relative to the amount of structural oxide needed to incorporate all of the dopant oxide (such as NiO) as part of a combined oxide (such as $NiAl_2O_4$). In the case of NiO and $Al_2O_3$, the molar ratio of Al to Ni in $NiAl_2O_4$ is 2.0. Thus, in such a ceramic composition, the molar ratio of Al to Ni can be greater than 2.0, such as 2.5 or more, or 3.0 or more, or 4.0 or more, or possibly still higher. It is noted that having a molar ratio of Al to Ni of 2.5 corresponds to having 25% more Al than is needed for full incorporation of the Ni into the combined oxide. In other words, there is a molar excess of Al of 25%. Similarly, having a molar ratio of Al to Ni of 3.0 corresponds to having 50% excess Al, and having a molar ratio of 4.0 corresponds to having 100% excess Al. It is noted that when a mixed oxide phase is formed between a dopant oxide and a first structural oxide, other structural oxides may be present that do not participate in forming the mixed oxide phase. For example, in the nickel oxide and alumina example described above, silica and/or titania can be present in smaller molar amounts than alumina. The presence of the silica and/or titania does not modify the calculation regarding the amount of excess alumina. The amount of excess structural oxide is determined based only on the structural oxides that participate in the mixed oxide phase.

More generally, the molar amount of metal from the structural oxide can be at least 5% greater than the amount needed stoichiometrically to fully incorporate the dopant metal into the mixed oxide (i.e., a molar excess of 5% or more), or at least 10% greater (molar excess of 10% or more), or at least 20% greater (molar excess of 20% or more), or at least 50% greater (molar excess of 50% or more), such as up to 500% greater (molar excess of 500% or more) or possibly still higher.

In various aspects, suitable dopant metals can include, but are not limited to, Ni, Co, Fe, Pd, Rh, Ru, Pt, Ir, Cu, Ag, Au, Zr, Cr, Ti, V, and combinations thereof. The dopant metal can be selected based on the desired type of catalytic activity. For example, for reforming of hydrocarbons in the presence of $H_2O$ and/or $CO_2$ to make hydrogen, Ni, Rh, Ru, Pd, Pt, Ir, and a combination of thereof can be suitable dopant metals. The weight of dopant oxide in the ceramic composition can range from 0.1 wt % to 50 wt %, or 1.0 wt % to 50 wt %, or 5.0 wt % to 40 wt %, or 10 wt % to 40 wt %, relative to the total weight of the ceramic composition. In some aspects where the dopant metal corresponds to a precious metal or noble metal, the weight of dopant oxide in the ceramic composition can range from 0.1 wt % to 10 wt %, or 0.1 wt % to 5.0 wt %, or 1.0 wt % to 10 wt %.

In various aspects, suitable metals for the structural oxide in the ceramic composition can include, but are not limited to, Al, Si, Ca, Mg, K, Na, Y, Zr, Hf, Ti, Cr, Mn, La, Ni, Co, and combinations thereof. The metal(s) for the structural oxide can be selected so that the structural oxide substantially does not convert to metallic form under the reducing conditions present in the cyclic reaction environment. As an example, when the dopant oxide is NiO, one option for a structural oxide is $Al_2O_3$. Another example of a suitable structural oxide in combination with NiO as the dopant oxide is a mixture of $Al_2O_3$ with $SiO_2$ and/or $TiO_2$. In such an example, $SiO_2$ can combine with $Al_2O_3$ to form a mullite phase that has increased resistance to thermal shock and/or mechanical failure. Additionally or alternately, in such an example, $TiO_2$ can be added to facilitate extrusion and sintering to form a ceramic monolith.

In some embodiments, a ceramic composition can further include additive components. Such additive components can correspond to additional structural components within the ceramic composition. For example, a ceramic composition may further comprise one or more silicates comprising a metal selected from the group consisting of Al, Si, Ca, Mg, K, Na, Y, Zr, Hf, Ti, Cr, Mn, Fe, Ni, Co, and mixtures thereof. One non-limiting example is bentonite, which is an aluminum phyllosilicate clay composed mostly of montmorillonite. The different types of bentonite are each named after the respective dominant element, such as potassium (K), sodium (Na), calcium (Ca), and aluminum (Al). For example, the chemical formula of sodium bentonite is $Al_2H_2Na_2O_{13}Si_4$. Some hydroxyl ions (OH—) can be present in silicates, but under high temperature calcination and sintering conditions, such hydroxyl groups can be converted to oxide form. Bentonite can be beneficial in fabrication of doped ceramic monoliths due to the ability of bentonite to facilitate extrusion.

In some optional aspects, a doped ceramic composition can include free silica (Sift). In some aspects, the amount of a free silica in a doped ceramic composition can be 10 wt % or less relative to a weight of the doped ceramic composition, or 5.0 wt % or less, or 2.0 wt % or less, such as down to 0.1 wt %, or down to 0.01 wt %, or possibly still lower. For example, the amount of free silica can be 0.1 wt % to 10 wt %, or 1.0 wt % to 10 wt %, or 0.1 wt % to 5.0 wt %, or 0.1 wt % to 2.0 wt %. Such free silica can correspond to silica that is present in the doped ceramic composition in the form of $SiO_2$, as opposed to silica present in the composition in the form of mullite (a solid solution of alumina and silica). Such free silica may be vaporized during the reforming process and deposited on active sites of the doped ceramic composition. In other aspects, a doped ceramic composition can include no silica, or can include silica only as silica incorporated as part of a solid solution or other mixed oxide.

Monolith Structure

In various aspects, the ceramic composition that is composed of at least one dopant oxide and at least one structural oxide (and optionally other structural components) may be prepared by manufacturing techniques such as but not limited to conventional ceramic powder manufacturing and processing techniques, e.g., mixing, milling, degassing, kneading, pressing, extruding, casting, drying, calcining, and sintering. The starting materials can correspond to a suitable ceramic powder and an organic binder powder in a suitable volume ratio. Certain process steps may be controlled or adjusted to obtain the desired grain size and porosity range and performance properties, such as by inclusion of various manufacturing, property adjusting, and processing additives and agents as are generally known in the art. For example, the two or more types of oxide powders may be mixed in the presence of an organic binder and one or more appropriate solvents for a time sufficient to substantially disperse the powders in each other. As another example, precursors of a dopant oxide, a stable oxide, or both may be dissolved in water at a desired ratio, spray dried, and calcined to make a mixed powder. Such precursors include (but are not limited to) chlorides, sulfates, nitrates, and mixtures thereof. The calcined powder can be further mixed in the presence of an organic binder and appropriate solvent(s) to make a mixed "dough". Then, the mixed "dough" of materials can be placed in a die or form, extruded, dried or otherwise formed into a desired shape. The resulting "green body" can then be sintered at temperatures in the range of about 1200° C.-1700° C. for at least ten minutes, such as from 10 minutes to 10 hours, or possibly from 10 minutes up to 48 hours or still longer.

The sintering operation may be performed in an oxidizing atmosphere, reducing atmosphere, or inert atmosphere, and at ambient pressure or under vacuum. For example, the oxidizing atmosphere could be air or oxygen, the inert atmosphere could be argon, and a reducing atmosphere could be hydrogen, $CO/CO_2$ or $H_2/H_2O$ mixtures. Thereafter, the sintered body is allowed to cool, typically to ambient conditions. The cooling rate may also be controlled to provide a desired set of grain and pore structures and performance properties in the particular component.

It has been unexpectedly discovered that limiting the maximum porosity in the final sintered body tends to effectively, if not actually, limit interconnectivity of the pore spaces with other pore spaces to an extent that increases or maximizes volumetric heat capacity of the sintered body. The porosity ranges for a doped ceramic material and components can depend upon the desired final component performance properties, but are within a range defined by one or more of the minimum porosity values and one or more of the maximum porosity values, or any set of values not expressly enumerated between the minimums and maximums. Examples of suitable porosity values are 0 vol % to 20 vol % porosity, or 0 vol % to 15 vol %, or 0 vol % to 10 vol %, or 0 vol % to 5 vol %.

The sintered monolith and/or other formed ceramic structure can have any convenient shape suitable for use as a catalytic surface. An example of a monolith can be an extruded honeycomb monolith. Honeycomb monoliths can be extruded structures that comprise many (e.g., a plurality, meaning more than one) small gas flow passages or conduits, arranged in parallel fashion with thin walls in between. A small reactor may include a single monolith, while a larger reactor can include a number of monoliths, while a still larger reactor may be substantially filled with an arrangement of many honeycomb monoliths. Each monolith may be formed by extruding monolith blocks with shaped (e.g., square or hexagonal) cross-section and two- or three-dimensionally stacking such blocks above, behind, and beside each other. Monoliths can be attractive as reactor internal structures because they provide high heat transfer capacity with minimum pressure drop.

In some aspects, honeycomb monoliths can be characterized as having open frontal area (or geometric void volume) between 25% and 55%, and having conduit density between 50 and 2000 pores or cells per square inch (CPSI), or between 100 and 900 cells per square inch, or between 100 cells per square inch to 600 cells per square inch. For example, in one embodiment, the conduits may have a diameter/characteristic cell side length of only a few millimeters, such as on the order of roughly one millimeter. Reactor media components, such as the monoliths or alternative bed media, can provide for channels that include a packing with an average wetted surface area per unit volume that ranges from 50 $ft^{-1}$ to 3000 $ft^{-1}$ (~0.16 $km^{-1}$ to ~10 $km^{-1}$), or from 100 $ft^{-1}$ to 2500 $ft^{-1}$ (~0.32 $km^{-1}$ to ~8.2 $km^{-1}$), or from 200 $ft^{-1}$ to 2000 $ft^{-1}$ (~0.65 $km^{-1}$ to ~6.5 $km^{-1}$), based upon the volume of the first reactor that is used to convey a reactant. These relatively high surface area per unit volume values can aid in achieving a relatively quick change in the temperature through the reactor, such as generally illustrated by the relatively steep slopes in the exemplary temperature gradient profile graphs shown in FIG. 1(a) or 1(b) of FIG. 1.

Reactor media components can also provide for channels that include a packing that includes a high volumetric heat transfer coefficient (e.g., 0.02 cal/$cm^3$s° C. or more, or 0.05 cal/$cm^3$s° C. or more, or 0.10 cal/cal/$cm^3$s° C. or more); that have low resistance to flow (low pressure drop); that have an operating temperature range consistent with the highest temperatures encountered during regeneration; that have high resistance to thermal shock; and/or that have high bulk heat capacity (e.g., 0.10 cal/$cm^3$s° C. or more, or 0.20 cal/$cm^3$s° C. or more). As with the high surface area values, these relatively high volumetric heat transfer coefficient values and/or other properties can aid in achieving a relatively quick change in the temperature through the reactor, such as generally illustrated by the relatively steep slopes in the exemplary temperature gradient profile graphs, such as in FIGS. 1(a) and 1(b) of FIG. 1. The cited values are averages based upon the volume of reactor used for conveyance of a reactant.

In various aspects, adequate heat transfer rate can be characterized by a heat transfer parameter, ΔTHT, below 500° C., or below 100° C., or below 50° C. The parameter ΔTHT, as used herein, is the ratio of the bed-average volumetric heat transfer rate that is needed for recuperation, to the volumetric heat transfer coefficient of the bed, hv. The volumetric heat transfer rate (e.g. cal/cm$^3$ sec) that is sufficient for recuperation can be calculated as the product of the gas flow rate (e.g. g/sec) with the gas heat capacity (e.g. cal/g° C.) and desired end-to-end temperature change (excluding any reaction, e.g. ° C.), and then this quantity can be divided by the volume (e.g. cm$^3$) of the reactor (or portion of a reactor) traversed by the gas. The volumetric heat transfer coefficient of the bed, hv, can typically be calculated as the product of an area-based coefficient (e.g. cal/cm$^2$s° C.) and a specific surface area for heat transfer (av, e.g. cm$^2$/cm$^3$), often referred to as the wetted area of the packing.

In some aspects, a washcoat can be added to the formed, sintered ceramic composition prior to exposing the composition to a reducing environment to form dopant metal particles. A washcoat can allow the sintered ceramic composition to be impregnated with additional catalytic metal. Such additional catalytic metal can be the same as the dopant metal or different.

One option for incorporating an additional catalytic metal into a washcoat can be to impregnate a catalyst support with the additional catalytic metal, such as by impregnation via incipient wetness. The impregnation can be performed with an aqueous solution of suitable metal salt or other catalytic metal precursor, such as tetramineplatinum nitrate or rhodium nitrate hydrate. The impregnated support can then be dried and/or calcined for decomposition of the catalytic metal precursor. A variety of temperature profiles can potentially be used for the heating steps. One or more initial drying steps can be used for drying the support, such as heating at a temperature from 100° C. to 200° C. for 0.5 hours to 24 hours. A calcination to decompose the catalytic metal precursor compound can be at a temperature of 200° C. to 800° C. for 0.5 hours to 24 hours, depending on the nature of the impregnated catalytic metal compound. Depending on the precursor for the catalytic metal, the drying step(s) and/or the decomposing calcination step(s) can be optional. Examples of additional catalytic metals can include, but are not limited to, Ni, Co, Fe, Pd, Rh, Ru, Pt, Ir, Cu, Ag, Au, Zr, Cr, Ti, V, and combinations thereof.

The catalyst (including support and catalytic metal) can then be used in any convenient manner. In some aspects, the catalyst can be coated on a structure, such as a monolith structure that can reside within a reactor. To form a washcoat solution, the catalyst can optionally be combined with a binder, such as an alumina binder. The mixture of catalyst and binder can then be added to water to form an aqueous suspension having 10 wt % to 50 wt % solids. For example, the aqueous suspension can include 10 wt % to 50 wt % solids, or 15 wt % to 40 wt %, or 10 wt % to 30 wt %. The amount of binder relative to the amount of solids can be any convenient amount, and the amount of binder can vary depending on the porosity and/or roughness. It is noted that smaller particles may adhere to the monolith surface better in the initial layer, so addition of a binder can assist with providing smaller particle sizes in a mixture of catalyst and binder particles. Optionally, an acid can be added to the aqueous solution to reduce the pH so as to reduce or minimize agglomeration of the alumina catalyst and/or binder particles. For example, acetic acid or another organic acid can be added to achieve a pH of 3 to 4. The suspension can then be ball milled (or processed in another manner) to achieve a desired particle size for the catalyst particles, such as a particle size of 0.5 μm to 5 μm. After milling, the solution can be stirred until time for use so that the particles are distributed substantially uniformly in the solution.

The washcoat solution can then be applied to a monolith structure to achieve a desired amount of catalyst (such as rhodium) on the monolith surface. As an example, in one aspect a washcoat thickness of 10 microns was achieved by forming a washcoat corresponding to 10 wt % of the monolith structure. Any convenient type of monolith structure can be used to provide a substantial surface area for support of the catalyst particles. The washcoat can be applied to the monolith to form cells having inner surfaces coated with the catalyst. One option for applying the washcoat can be to dip or otherwise submerge the monolith in the washcoat. After clearing the cell channels of excess washcoat, the monolith can be dried and/or calcined. Drying can correspond to heating at 100° C. to 200° C. for 0.5 hours to 24 hours, while calcining can correspond to heating at 200° C. to 800° C. for 0.5 hours to 24 hours.

Composition After Exposure to Cyclic Reaction Environment

After forming a ceramic composition into a desired structural form, such as a monolith, the ceramic composition can be exposed to a reducing environment to form a catalytic composition including metal dopant particles on the surface of the composition. The catalytic composition can then be used, for example, in a cyclic reaction environment.

The cyclic reaction environment can include exposing the ceramic composition to alternating periods of oxidizing conditions and reducing conditions at elevated temperatures. The elevated temperatures can correspond to temperatures of 500° C. to 1400° C., depending on the nature of the composition and the desired reaction. The nature of the oxidizing and reducing conditions can also vary depending on the desired reaction. An example of reforming conditions can be steam reforming or dry reforming conditions for reforming of methane or other hydrocarbons.

When the ceramic composition is initially introduced into the reactor, the surface of the ceramic composition can correspond to various oxides. It has been unexpectedly discovered that initial exposure to a reducing environment followed by exposure to a cyclic reaction environment including both reducing conditions and oxidizing conditions can increase or enhance the catalytic activity of the ceramic composition. To achieve this enhanced catalytic activity, the composition can be exposed to at least one time period of reducing environment to form dopant metal particles on the surface of the composition. After the initial exposure to the reducing environment, the ceramic composition can be catalytically active, so long as the composition is exposed to a cyclic environment that provides both reducing and oxidizing conditions. In some aspects, the catalytic activity can initially increase with continued exposure to the cyclic environment, and then eventually "line-out" or stabilize at an activity level over time. Suitable types of reactors for providing the cyclic reaction environment can include, but are not limited to, reforming reactors, reverse flow reactors, and regenerative reactors.

During initial exposure to the reducing environment, at least a portion of the dopant oxide at and/or near the surface of the ceramic composition can be converted to dopant metal. The oxygen from the dopant oxide can be incorporated into the gas phase components of the reducing environment. This can result in formation of particles of the dopant metal on the surface of the composition, such as metal microparticles or metal nanoparticles. The oxygen from the dopant metal particles can be incorporated, for example, into the gas phase reaction products generated by the reducing environment. For example, in a reducing environment that corresponds to a methane reforming environment, the oxygen from the dopant metal can partially oxidize a portion of the methane reforming products to form CO and/or $H_2O$. In some aspects, the initial reducing conditions can correspond to conditions used only for the initial reducing step. Alternatively, the reducing conditions can correspond to reaction environment conditions for the subsequent cycle(s) of reducing and oxidizing conditions. Examples of suitable reducing conditions for either the initial reducing exposure or for use in a cyclic reaction environment can include, but are not limited to, conditions for performing steam reforming of hydrocarbons, dry reforming of hydrocarbons, coal gasification, pyrolysis of hydrocarbons to form acetylene or olefins, and steam cracking. Examples of reducing environments include environments containing methane, ethane, propane, butane, higher C number paraffins, ethylene, propylene, butylene, higher C number olefins, acetylene, methylacetylene-propadiene (MAPD), hydrogen, carbon monoxide, hydrides, hydrogen sulfide, or combinations thereof. It is noted that an environment include both 02 and a potential reducing environment component generally corresponds to an oxidizing environment (such as a combustion environment), unless the 02 correspond to 5 mol % or less of the stoichiometric amount for combustion of the reducing environment component(s).

The particles of dopant metal formed on the structural oxide can have a characteristic length of 10 μm or less, or 5.0 μm or less, or 2.5 μm or less, such as down to 0.01 μm or possibly still smaller. In this discussion, the characteristic length for a particle is defined as the diameter of the smallest bounding sphere that can contain the particle.

After formation of particles of the dopant metal and/or at the end of the reducing portion of a reaction cycle, the ceramic composition can be exposed to an oxidizing environment. Without being bound by any particular theory, it is believed that the oxidizing environment can remove any coke that has accumulated on the dopant metal particles and/or other active sites on the surface. Optionally, the oxidizing environment can also oxidize a portion of the dopant metal on the surface, converting a portion of the dopant metal back into metal oxide. An example of an oxidizing environment can be a gas phase environment including air or another gas phase composition that includes $O_2$. More generally, examples of oxidizing environments include environments containing oxygen ($O_2$), carbon dioxide, carbon monoxide, water, combustion byproducts, peroxide, ozone, permanganate, organic acids, halides, or combinations thereof. It is noted that formation of combustion byproducts may be performed in-situ, so that the oxidizing environment may also include a fuel, such as a hydrocarbon fuel. It is understood that a variety of oxidizing/reducing environment combinations are potentially available for providing a cyclic reaction environment.

Process Example—Reverse Flow Reforming and Regeneration

A ceramic monolith that can be activated by reducing conditions and provide catalytic activity under cyclic reaction conditions, as described herein, can be suitable in some aspects for reforming of hydrocarbons under steam reforming conditions in the presence of $H_2O$, under dry reforming conditions in the presence of $CO_2$, or under conditions where both $H_2O$ and $CO_2$ are present in the reaction environment. As a general overview of operation during reforming in a swing reactor, such as a reverse flow reactor, a regeneration step or portion of a reaction cycle can be used to provide heat for the reactor. Reforming can then occur within the reactor during a reforming step or portion of the cycle, with the reforming reaction consuming heat provided during the reactor regeneration step. During reactor regeneration, fuel and an oxidant are introduced into the reactor from a regeneration end of the reactor. The bed and/or monoliths in the regeneration portion of the reactor can absorb heat, but typically do not include a catalyst for reforming. As the fuel and oxidant pass through the regeneration section, heat is transferred from the regeneration section to the fuel and oxidant. Combustion does not occur immediately, but instead the location of combustion is controlled to occur in a middle portion of the reactor. The flow of the reactants continues during the regeneration step, leading to additional transfer of the heat generated from combustion into the reforming end of the reactor.

After a sufficient period of time, the combustion reaction is stopped. Any remaining combustion products and/or reactants can optionally be purged. The reforming step or portion of the reaction cycle can then start. The reactants for reforming can be introduced into the reforming end of the reactor, and thus flow in effectively the opposite direction relative to the flow during regeneration. The bed and/or monoliths in the reforming portion of the reactor can include a catalyst for reforming. In various aspects, at least a portion of the catalyst can correspond to a catalyst formed from a ceramic composition as described herein. As reforming occurs, the heat introduced into the reforming zone during combustion can be consumed by the endothermic reforming reaction. After exiting the reforming zone, the reforming products (and unreacted reactants) are no longer exposed to a reforming catalyst. As the reforming products pass through the regeneration zone, heat can be transferred from the products to the regeneration zone. After a sufficient period of time, the reforming process can be stopped, remaining reforming products can optionally be collected or purged from the reactor, and the cycle can start again with a regeneration step.

The reforming reaction performed within the reactor can correspond reforming of methane and/or other hydrocarbons using steam reforming, in the presence of $H_2O$; using dry reforming, in the presence of $CO_2$, or using "bi" reforming in the presence of both $H_2O$ and $CO_2$. Examples of stoichiometry for steam, dry, and "bi" reforming of methane are shown in equations (1)-(3).

$$\text{Dry Reforming: } CH_4 + CO_2 = 2CO + 2H_2 \tag{1}$$

$$\text{Steam Reforming: } CH_4 + H_2O = CO + 3H_2 \tag{2}$$

$$\text{Bi Reforming: } 3CH_4 + 2H_2O + CO_2 = 4CO + 8H_2. \tag{3}$$

As shown in equations (1)-(3), dry reforming can produce lower ratios of $H_2$ to CO than steam reforming. Reforming reactions performed with only steam can generally produce a ratio of $H_2$ to CO of around 3, such as 2.5 to 3.5. By contrast, reforming reactions performed in the presence of $CO_2$ can generate much lower ratios, possibly approaching a ratio of $H_2$ to CO of roughly 1.0 or even lower. By using a combination of $CO_2$ and $H_2O$ during reforming, the reforming reaction can potentially be controlled to generate a wide variety of $H_2$ to CO ratios in a resulting syngas.

It is noted that the ratio of $H_2$ to CO in a synthesis gas can also be dependent on the water gas shift equilibrium. Although the above stoichiometry shows ratios of roughly 1 or roughly 3 for dry reforming and steam reforming, respectively, the equilibrium amounts of $H_2$ and CO in a synthesis gas can be different from the reaction stoichiometry. The equilibrium amounts can be determined based on the water gas shift equilibrium, which relates the concentrations of $H_2$, CO, $CO_2$ and $H_2O$ based on the reaction

$$H_2O + CO \Leftrightarrow H_2 + CO_2 \qquad (4)$$

Most reforming catalysts, such as rhodium and/or nickel, can also serve as water gas shift catalysts. Thus, if reaction environment for producing $H_2$ and CO also includes $H_2O$ and/or $CO_2$, the initial stoichiometry from the reforming reaction may be altered based on the water gas shift equilibrium. This equilibrium is also temperature dependent, with higher temperatures favoring production of CO and $H_2O$. It is noted that higher temperatures can also improve the rate for reaching equilibrium. As a result, the ability to perform a reforming reaction at elevated temperatures can potentially provide several benefits. For example, instead of performing steam reforming in an environment with excess $H_2O$, $CO_2$ can be added to the reaction environment. This can allow for both a reduction in the ratio of $H_2$ to CO produced based on the dry reforming stoichiometry as well as a reduction in the ratio of $H_2$ to CO produced based on the water gas shift equilibrium. Alternatively, if a higher $H_2$ to CO ratio is desired, $CO_2$ can be removed from the environment, and the ratio of $H_2O$ to $CH_4$ (or other hydrocarbons) can be controlled to produce a desirable type of synthesis gas. This can potentially allow for generation of a synthesis gas having a $H_2$ to CO ratio of 0.1 to 15, or 0.1 to 3.0, or 0.5 to 5.0, or 1.0 to 10, by selecting appropriate amounts of feed components.

The reforming reactions shown in equations (1)-(3) are endothermic reactions. One of the challenges in commercial scale reforming can be providing the heat for performing the reforming reaction in an efficient manner while reducing or minimizing introduction of additional components into the desired synthesis gas product. Cyclic reaction systems, such as reverse flow reactor systems, can provide heat in a desirable manner by having a cycle including a reforming step and a regeneration step. During the regeneration step, combustion can be performed within a selected area of the reactor. A gas flow during regeneration can assist with transferring this heat from the combustion zone toward additional portions of the reforming zone in the reactor. The reforming step within the cycle can be a separate step, so that incorporation of products from combustion into the reactants and/or products from reforming can be reduced or minimized. The reforming step can consume heat, which can reduce the temperature of the reforming zone. As the products from reforming pass through the reactor, the reforming products can pass through a second zone that lacks a reforming or water gas shift catalyst. This can allow the reaction products to cool prior to exiting the reactor. The heat transferred from the reforming products to the reactor can then be used to increase the temperature of the reactants for the next combustion or regeneration step.

One common source for methane is natural gas. In some applications, natural gas, including associated hydrocarbon and impurity gases, may be used as a feed for the reforming reaction. The supplied natural gas also may be sweetened and/or dehydrated natural gas. Natural gas commonly includes various concentrations of associated gases, such as ethane and other alkanes, preferably in lesser concentrations than methane. The supplied natural gas may include impurities, such as $H_2S$ and nitrogen. More generally, the hydrocarbon feed for reforming can include any convenient combination of methane and/or other hydrocarbons. Optionally, the reforming feed may also include some hydrocarbonaceous compounds, such as alcohols or mercaptans, which are similar to hydrocarbons but include one or more heteroatoms different from carbon and hydrogen. In some aspects, an additional component present in the feed can correspond to impurities such as sulfur that can adsorb to the catalytic monolith during a reducing cycle (such as a reforming cycle). Such impurities can be oxidized in a subsequent cycle to form sulfur oxide, which can then be reduced to release additional sulfur-containing components (or other impurity-containing components) into the reaction environment.

In some aspects, the feed for reforming can include, relative to a total weight of hydrocarbons in the feed for reforming, 5 wt % or more of $C_{2+}$ compounds, such as ethane or propane, or 10 wt % or more, or 15 wt % or more, or 20 wt % or more, such as up to 50 wt % or possibly still higher. It is noted that nitrogen and/or other gases that are non-reactive in a combustion environment, such as $H_2O$ and $CO_2$, may also be present in the feed for reforming. In aspects where the reformer corresponds to an on-board reforming environment, such non-reactive products can optionally be introduced into the feed, for example, based on recycle of an exhaust gas into the reformer. Additionally or alternately, the feed for reforming can include 40 wt % or more methane, or 60 wt % or more, or 80 wt % or more, or 95 wt % or more, such as having a feed that is substantially composed of methane (98 wt % or more). In aspects where the reforming corresponds to steam reforming, a molar ratio of steam molecules to carbon atoms in the feed can be 0.3 to 4.0. It is noted that methane has 1 carbon atom per molecule while ethane has 2 carbon atoms per molecule. In aspects where the reforming corresponds to dry reforming, a molar ratio of $CO_2$ molecules to carbon atoms in the feed can be 0.05 to 3.0.

Within the reforming zone of a reverse flow reactor, the temperature can vary across the zone due to the nature of how heat is added to the reactor and/or due to the kinetics of the reforming reaction. The highest temperature portion of the zone can typically be found near a middle portion of the reactor. This middle portion can be referred to as a mixing zone where combustion is initiated during regeneration. At least a portion of the mixing zone can correspond to part of the reforming zone if a monolith with reforming catalyst extends into the mixing zone. As a result, the location where combustion is started during regeneration can typically be near to the end of the reforming zone within the reactor. Moving from the center of the reactor to the ends of the reactor, the temperature can decrease. As a result, the temperature at the beginning of the reforming zone (at the end of the reactor) can be cooler than the temperature at the end of the reforming zone (in the middle portion of the reactor).

As the reforming reaction occurs, the temperature within the reforming zone can be reduced. The rate of reduction in temperature can be related to the kinetic factors of the amount of available hydrocarbons for reforming and/or the temperature at a given location within the reforming zone. As the reforming feed moves through the reforming zone, the reactants in the feed can be consumed, which can reduce the amount of reforming that occurs at downstream locations. However, the increase in the temperature of the reforming zone as the reactants move across the reforming zone can lead to an increased reaction rate.

At roughly 500° C., the reaction rate for reforming can be sufficiently reduced that little or no additional reforming will occur. As a result, in some aspects as the reforming reaction progresses, the beginning portion of the reforming zone can cool sufficiently to effectively stop the reforming reaction within a portion of the reforming zone. This can move the location within the reactor where reforming begins to a location that is further downstream relative to the beginning of the reforming zone. When a sufficient portion of the reforming zone has a temperature below 500° C., or below 600° C., the reforming step within the reaction cycle can be stopped to allow for regeneration. Alternatively, based on the amount of heat introduced into the reactor during regeneration, the reforming portion of the reaction cycle can be stopped based on an amount of reaction time, so that the amount of heat consumed during reforming (plus heat lost to the environment) is roughly in balance with the amount of heat added during regeneration. After the reforming process is stopped, any remaining synthesis gas product still in the reactor can optionally be recovered prior to starting the regeneration step of the reaction cycle.

The regeneration process can then be initiated. During regeneration, a fuel such as methane, natural gas, or H$_2$, and oxygen can be introduced into the reactor and combusted. The location where the fuel and oxidant are allowed to mix can be controlled in any convenient manner, such as by introducing the fuel and oxidant via separate channels. By delaying combustion during regeneration until the reactants reach a central portion of the reactor, the non-reforming end of the reactor can be maintained at a cooler temperature. This can also result in a temperature peak in a middle portion of the reactor. The temperature peak can be located within a portion of the reactor that also includes the reforming catalyst. During a regeneration cycle, the temperature within the reforming reactor can be increased sufficiently to allow for the reforming during the reforming portion of the cycle. This can result in a peak temperature within the reactor of 1100° C. or more, or 1200° C. or more, or 1300° C. or more, or potentially a still higher temperature.

The relative length of time and reactant flow rates for the reforming and regeneration portions of the process cycle can be selected to balance the heat provided during regeneration with the heat consumed during reforming. For example, one option can be to select a reforming step that has a similar length to the regeneration step. Based on the flow rate of hydrocarbons, H$_2$O, and/or CO$_2$ during the reforming step, an endothermic heat demand for the reforming reaction can be determined. This heat demand can then be used to calculate a flow rate for combustion reactants during the regeneration step. Of course, in other aspects the balance of heat between reforming and regeneration can be determined in other manners, such as by determining desired flow rates for the reactants and then selecting cycle lengths so that the heat provided by regeneration balances with the heat consumed during reforming.

In addition to providing heat, the reactor regeneration step during a reaction cycle can also allow for coke removal from the catalyst within the reforming zone. In various aspects, one or more types of catalyst regeneration can potentially occur during the regeneration step. One type of catalyst regeneration can correspond to removal of coke from the catalyst. During reforming, a portion of the hydrocarbons introduced into the reforming zone can form coke instead of forming CO or CO$_2$. This coke can potentially block access to the catalytic sites (such as metal sites) of the catalyst. In some aspects, the rate of formation can be increased in portions of the reforming zone that are exposed to higher temperatures, such as portions of the reforming zone that are exposed to temperatures of 800° C. or more, or 900° C. or more, or 1000° C. or more. During a regeneration step, oxygen can be present as the temperature of the reforming zone is increased. At the temperatures achieved during regeneration, at least a portion of the coke generated during reforming can be removed as CO or CO$_2$.

Due to the variation in temperature across the reactor, several options can be used for characterizing the temperature within the reactor and/or within the reforming zone of the reactor. One option for characterizing the temperature can be based on an average bed or average monolith temperature within the reforming zone. In practical settings, determining a temperature within a reactor requires the presence of a measurement device, such as a thermocouple. Rather than attempting to measure temperatures within the reforming zone, an average (bed or monolith) temperature within the reforming zone can be defined based on an average of the temperature at the beginning of the reforming zone and a temperature at the end of the reforming zone. Another option can be to characterize the peak temperature within the reforming zone after a regeneration step in the reaction cycle. Generally, the peak temperature can occur at or near the end of the reforming zone, and may be dependent on the location where combustion is initiated in the reactor. Still another option can be to characterize the difference in temperature at a given location within the reaction zone at different times within a reaction cycle. For example, a temperature difference can be determined between the temperature at the end of the regeneration step and the temperature at the end of the reforming step. Such a temperature difference can be characterized at the location of peak temperature within the reactor, at the entrance to the reforming zone, at the exit from the reforming zone, or at any other convenient location.

In various aspects, the reaction conditions for reforming hydrocarbons can include one or more of an average reforming zone temperature ranging from 400° C. to 1200° (or more); a peak temperature within the reforming zone of 800° C. to 1500° C.; a temperature difference at the location of peak temperature between the end of a regeneration step and the end of the subsequent reforming step of 25° C. or more, or 50° C. or more, or 100° C. or more, or 200° C. or more, such as up to 800° C. or possibly still higher; a temperature difference at the entrance to the reforming zone between the end of a regeneration step and the end of the subsequent reforming step of 25° C. or more, or 50° C. or more, or 100° C. or more, or 200° C. or more, such as up to 800° C. or possibly still higher; and/or a temperature difference at the exit from the reforming zone between the end of a regeneration step and the end of the subsequent reforming step of 25° C. or more, or 50° C. or more, or 100° C. or more, or 200° C. or more, such as up to 800° C. or possibly still higher.

With regard to the average reforming zone temperature, in various aspects the average temperature for the reforming zone can be 500° C. to 1500° C., or 400° C. to 1200° C., or 800° C. to 1200° C., or 400° C. to 900° C., or 600° C. to 1100° C., or 500° C. to 1000° C. Additionally or alternatively, with regard to the peak temperature for the reforming zone (likely corresponding to a location in the reforming zone close to the location for combustion of regeneration reactants), the peak temperature can be 800° C. to 1500° C., or 1000° C. to 1400° C., or 1200° C. to 1500° C., or 1200° C. to 1400° C.

Additionally or alternately, the reaction conditions for reforming hydrocarbons can include a pressure of 0 psig to 1500 psig (10.3 MPa), or 0 psig to 1000 psig (6.9 MPa), or 0 psig to 550 psig (3.8 MPa); and a gas hourly space velocity of reforming reactants of 1000 hr$^{-1}$ to 50,000 hr$^{-1}$. The space velocity corresponds to the volume of reactants relative to the volume of monolith per unit time. The volume of the monolith is defined as the volume of the monolith as if it was a solid cylinder.

In some aspects, an advantage of operating the reforming reaction at elevated temperature can be the ability to convert substantially all of the methane and/or other hydrocarbons in a reforming feed. For example, for a reforming process where water is present in the reforming reaction environment (i.e., steam reforming or bi-reforming), the reaction conditions can be suitable for conversion of 10 wt % to 100 wt % of the methane in the reforming feed, or 20 wt % to 80 wt %, or 50 wt % to 100 wt %, or 80 wt % to 100 wt %, or 10 wt % to 98 wt %, or 50 wt % to 98 wt %. Additionally or alternately, the reaction conditions can be suitable for conversion of 10 wt % to 100 wt % of the hydrocarbons in the reforming feed, or 20 wt % to 80 wt %, or 50 wt % to 100 wt %, or 80 wt % to 100 wt %, or 10 wt % to 98 wt %, or 50 wt % to 98 wt %

In other aspects, for a reforming process where carbon dioxide is present in the reforming reaction environment (i.e., dry reforming or bi-reforming), the reaction conditions can be suitable for conversion of 10 wt % to 100 wt % of the methane in the reforming feed, or 20 wt % to 80 wt %, or 50 wt % to 100 wt %, or 80 wt % to 100 wt %, or 10 wt % to 98 wt %, or 50 wt % to 98 wt %. Additionally or alternately, the reaction conditions can be suitable for conversion of 10 wt % to 100 wt % of the hydrocarbons in the reforming feed, or 20 wt % to 80 wt %, or 50 wt % to 100 wt %, or 80 wt % to 100 wt %, or 10 wt % to 98 wt %, or 50 wt % to 98 wt %.

In some alternative aspects, the reforming reaction can be performed under dry reforming conditions, where the reforming is performed with $CO_2$ as a reagent but with a reduced or minimized amount of $H_2O$ in the reaction environment. In such alternative aspects, a goal of the reforming reaction can be to produce a synthesis gas with a $H_2$ to CO ratio of 1.0 or less. In some aspects, the temperature during reforming can correspond to the temperature ranges described for steam reforming. Optionally, in some aspects a dry reforming reaction can be performed at a lower temperature of between 500° C. to 700° C., or 500° C. to 600° C. In such aspects, the ratio of $H_2$ to CO can be 0.3 to 1.0, or 0.3 to 0.7, or 0.5 to 1.0. Performing the dry reforming reaction under these conditions can also lead to substantial coke production, which can require removal during regeneration in order to maintain catalytic activity.

Example of Reverse Flow Reactor Configuration

For endothermic reactions operated at elevated temperatures, such as hydrocarbon reforming, a reverse flow reactor can provide a suitable reaction environment for providing the heat for the endothermic reaction.

In a reverse flow reactor, the heat needed for an endothermic reaction may be provided by creating a high-temperature heat bubble in the middle of the reactor. A two-step process can then be used wherein heat is (a) added to the reactor bed(s) or monolith(s) via in-situ combustion, and then (b) removed from the bed in-situ via an endothermic process, such as reforming, pyrolysis, or steam cracking. This type of configuration can provide the ability to consistently manage and confine the high temperature bubble in a reactor region(s) that can tolerate such conditions long term. A reverse flow reactor system can allow the primary endothermic and regeneration processes to be performed in a substantially continuous manner.

A reverse flow reactor system can include first and second reactors, oriented in a series relationship with each other with respect to a common flow path, and optionally but preferably along a common axis. The common axis may be horizontal, vertical, or otherwise. During a regeneration step, reactants (e.g., fuel and oxygen) are permitted to combine or mix in a reaction zone to combust therein, in-situ, and create a high temperature zone or heat bubble inside a middle portion of the reactor system. The heat bubble can correspond to a temperature that is at least about the initial temperature for the endothermic reaction. Typically, the temperature of the heat bubble can be greater than the initial temperature for the endothermic reaction, as the temperature will decrease as heat is transferred from the heat bubble in a middle portion of the reactor toward the ends of the reactor. In some aspects, the combining can be enhanced by a reactant mixer that mixes the reactants to facilitate substantially complete combustion/reaction at the desired location, with the mixer optionally located between the first and second reactors. The combustion process can take place over a long enough duration that the flow of first and second reactants through the first reactor also serves to displace a substantial portion, (as desired) of the heat produced by the reaction (e.g., the heat bubble), into and at least partially through the second reactor, but preferably not all of the way through the second reactor to avoid waste of heat and overheating the second reactor. The flue gas may be exhausted through the second reactor, but preferably most of the heat is retained within the second reactor. The amount of heat displaced into the second reactor during the regeneration step can also be limited or determined by the desired exposure time or space velocity that the hydrocarbon feed gas will have in the endothermic reaction environment.

After regeneration or heating the second reactor media (which can include and/or correspond to a ceramic catalyst composition as described herein), in the next/reverse step or cycle, reactants for the endothermic reaction methane (and/or natural gas and/or another hydrocarbon) can be supplied or flowed through the second reactor, from the direction opposite the direction of flow during the heating step. For example, in a reforming process, methane (and/or natural gas and/or another hydrocarbon) can be supplied or flowed through the second reactor. The methane can contact the hot second reactor and mixer media, in the heat bubble region, to transfer the heat to the methane for reaction energy.

For some aspects, the basic two-step asymmetric cycle of a reverse flow regenerative bed reactor system is depicted in FIGS. 1(a) and 1(b) of FIG. 1 in terms of a reactor system having two zones/reactors; a first or recuperator/quenching zone (7) and a second or reaction zone (1). Both the reaction zone (1) and the recuperator zone (7) can contain regenerative monoliths and/or other regenerative structures formed from a doped ceramic composition. Regenerative monoliths or other regenerative structures, as used herein, comprise materials that are effective in storing and transferring heat as well as being effective for carrying out a chemical reaction. The regenerative monoliths and/or other structures can correspond to any convenient type of material that is suitable for storing heat, transferring heat, and catalyzing a reaction. Examples of structures can include bedding or packing material ceramic beads or spheres, ceramic honeycomb materials, ceramic tubes, extruded monoliths, and the like, provided they are competent to maintain integrity, functionality, and withstand long term exposure to temperatures in excess of 1200° C., or in excess of 1400° C., or in excess of 1600° C., which can allow for some operating margin. In some aspects, the catalytic ceramic monolith and/or other catalytic ceramic structure can be used without the presence of an additional washcoat.

To facilitate description of FIG. 1, the reactor is described herein with reference to a reforming reaction. It is understood that other convenient types of endothermic reactions can generally be performed using a reverse flow reactor, such as the reactor shown in FIG. 1.

As shown in FIG. 1(a) of FIG. 1, at the beginning of the "reaction" step of the cycle, a secondary end 5 of the reaction zone 1 (a.k.a. herein as the second reactor) can be at an elevated temperature as compared to the primary end 3 of the reaction zone 1, and at least a portion (including the first end 9) of the recuperator or quench zone 7 (a.k.a. herein as the first reactor), can be at a lower temperature than the reaction zone 1 to provide a quenching effect for the resulting product. In an aspect where the reactors are used to perform reverse flow reforming, a methane-containing reactant feed (or other hydrocarbon-containing reactant feed) can be introduced via a conduit(s) 15, into a primary end 3 of the reforming or reaction zone 1. In various aspects, the hydrocarbon-containing reactant feed can also contain $H_2O$, $CO_2$, or a combination thereof.

The feed stream from inlet(s) 15 can absorb heat from reaction zone 1 and endothermically react to produce the desired synthesis gas product. As this step proceeds, a shift in the temperature profile 2, as indicated by the arrow, can be created based on the heat transfer properties of the system. When the ceramic catalyst monolith/other catalyst structure is designed with adequate heat transfer capability, this profile can have a relatively sharp temperature gradient, which gradient can move across the reaction zone 1 as the reforming step proceeds. In some aspects, a sharper temperature gradient profile can provide for improved control over reaction conditions. In aspects where another type of endothermic reaction is performed, a similar shift in temperature profile can occur, so that a temperature gradient moves across reaction zone 1 as the reaction step proceeds.

The effluent from the reforming reaction, which can include unreacted feed components (hydrocarbons, $H_2O$, $CO_2$) as well as synthesis gas components, can exit the reaction zone 1 through a secondary end 5 at an elevated temperature and pass through the recuperator reactor 7, entering through a second end 11, and exiting at a first end 9. The recuperator 7 can initially be at a lower temperature than the reaction zone 1. As the products (and optionally unreacted feed) from the reforming reaction pass through the recuperator zone 7, the gas can be quenched or cooled to a temperature approaching the temperature of the recuperator zone substantially at the first end 9, which in some embodiments can be approximately the same temperature as the regeneration feed introduced via conduit 19 into the recuperator 7 during the second step of the cycle. As the reforming effluent is cooled in the recuperator zone 7, a temperature gradient 4 can be created in the zone's regenerative bed(s) and can move across the recuperator zone 7 during this step. The quenching can heat the recuperator 7, which can be cooled again in the second step to later provide another quenching service and to prevent the size and location of the heat bubble from growing progressively through the quench reactor 7. After quenching, the reaction gas can exit the recuperator at 9 via conduit 17 and can be processed for separation and recovery of the various components.

The second step of the cycle, referred to as the regeneration step, can then begin with reintroduction of the first and second regeneration reactants via conduit(s) 19. The first and second reactants can pass separately through hot recuperator 7 toward the second end 11 of the recuperator 7, where they can be combined for exothermic reaction or combustion in or near a central region 13 of the reactor system.

An example of the regeneration step is illustrated in FIG. 1(b) of FIG. 1. Regeneration can entail transferring recovered sensible heat from the recuperator zone 7 to the reaction zone 1 to thermally regenerate the reaction beds 1 for the subsequent reaction cycle. Regeneration gas/reactants can enter recuperator zone 7, such as via conduit(s) 19, and flow through the recuperator zone 7 and into the reaction zone 1. In doing so, the temperature gradients 6 and 8 may move across the beds as illustrated by the arrows on the exemplary graphs in FIG. 1(b), similar to but in opposite directions to the graphs of the temperature gradients developed during the reaction cycle in FIG. 1(a) of FIG. 1. Fuel and oxidant reactants may combust at a region proximate to the interface 13 of the recuperator zone 7 and the reaction zone 1. The heat recovered from the recuperator zone together with the heat of combustion can be transferred to the reaction zone, thermally regenerating the regenerative reaction monoliths and/or beds 1 disposed therein.

In some aspects, several of the conduits within a channel may convey a mixture of first and second reactants, due at least in part to some mixing at the first end (17) of the first reactor. However, the numbers of conduits conveying combustible mixtures of first and second reactants can be sufficiently low such that the majority of the stoichiometrically reactable reactants will not react until after exiting the second end of the first reactor. The axial location of initiation of combustion or exothermic reaction within those conduits conveying a mixture of reactants can be controlled by a combination of temperature, time, and fluid dynamics. Fuel and oxygen usually require a temperature-dependent and mixture-dependent autoignition time to combust. Still though, some reaction may occur within an axial portion of the conduits conveying a mixture of reactants. However, this reaction can be acceptable because the number of channels having such reaction can be sufficiently small that there is only an acceptable or inconsequential level of effect upon the overall heat balance within the reactor. The design details of a particular reactor system can be selected so as to avoid mixing of reactants within the conduits as much as reasonably possible.

Figure 2:
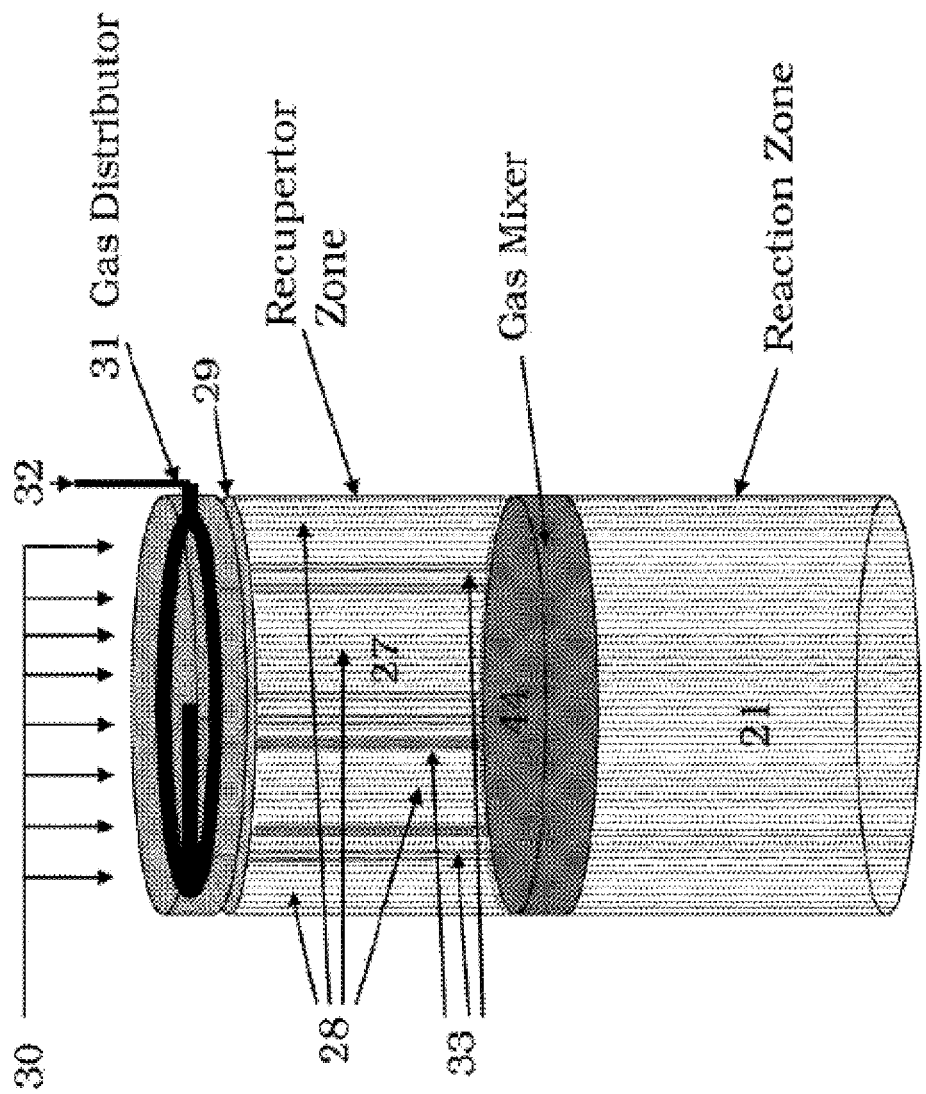
FIG. 2 schematically shows an example of a reverse flow reactor.

FIG. 2 illustrates another exemplary reactor system that may be suitable in some applications for controlling and deferring the combustion of fuel and oxidant to achieve efficient regeneration heat. FIG. 2 depicts a single reactor system, operating in the regeneration cycle. The reactor system may be considered as comprising two reactors zones. The recuperator 27 can be the zone primarily where quenching takes place and provides substantially isolated flow paths or channels for transferring both of the quenching reaction gases through the reactor media, without incurring combustion until the gasses arrive proximate or within the reactor core 13 in FIG. 1. The reformer 2 can be the reactor where regeneration heating and methane (and/or hydrocarbon) reformation primarily occurs, and may be considered as the second reactor for purposes herein. Although the first and second reactors in the reactor system are identified as separately distinguishable reactors, it is understood that the first and second reactors may be manufactured, provided, or otherwise combined into a common single reactor bed, whereby the reactor system might be described as comprising merely a single reactor that integrates both cycles within the reactor. The terms "first reactor" and "second reactor" can merely refer to the respective zones within the reactor system whereby each of the regeneration, reformation, quenching, etc., steps take place and do not require that separate components be utilized for the two reactors. However, various aspects can comprise a reactor system whereby the recuperator reactor includes conduits and channels as described herein, and the reformer reactor may similarly possess conduits. Additionally or alternately, some aspects may include a reformer reactor bed that is arranged different from and may even include different materials from, the recuperator reactor bed.

As discussed previously, the first reactor or recuperator 27 can include various gas conduits 28 for separately channeling two or more gases following entry into a first end 29 of the recuperator 27 and through the regenerative bed(s) disposed therein. A first gas 30 can enter a first end of a plurality of flow conduits 28. In addition to providing a flow channel, the conduits 28 can also comprise effective flow barriers (e.g., which effectively function such as conduit walls) to prevent cross flow or mixing between the first and second reactants and maintain a majority of the reactants effectively separated from each other until mixing is permitted. As discussed previously, each of the first and second channels can comprise multiple channels or flow paths. The first reactor may also comprise multiple substantially parallel flow segments, each comprising segregated first and second channels.

In some aspects, the recuperator can be comprised of one or more extruded honeycomb monoliths, as described above. Each monolith may provide flow channel(s) (e.g., flow paths) for one of the first or second reactants. Each channel preferably includes a plurality of conduits. Alternatively, a monolith may comprise one or more channels for each reactant with one or more channels or groups of conduits dedicated to flowing one or more streams of a reactant, while the remaining portion of conduits flow one or more streams of the other reactant. It is recognized that at the interface between channels, a number of conduits may convey a mixture of first and second reactant, but this number of conduits is proportionately small.

Alternative embodiments may use reactor media other than monoliths, such as whereby the channel conduits/flow paths may include a more tortuous pathways (e.g. convoluted, complex, winding and/or twisted but not linear or tubular), including but not limited to labyrinthine, variegated flow paths, conduits, tubes, slots, and/or a pore structure having channels through a portion(s) of the reactor and may include barrier portion, such as along an outer surface of a segment or within sub-segments, having substantially no effective permeability to gases, and/or other means suitable for preventing cross flow between the reactant gases and maintaining the first and second reactant gases substantially separated from each other while axially transiting the recuperator 27. Such other types of reactor media can be suitable, so long as at least a portion of such media can be formed by sintering a ceramic catalytic composition as described herein, followed by exposing such media to reducing conditions to activate the catalyst. For such embodiments, the complex flow path may create a lengthened effective flow path, increased surface area, and improved heat transfer. Such design may be preferred for reactor embodiments having a relatively short axial length through the reactor. Axially longer reactor lengths may experience increased pressure drops through the reactor. However for such embodiments, the porous and/or permeable media may include, for example, at least one of a packed bed, an arrangement of tiles, a permeable solid media, a substantially honeycomb-type structure, a fibrous arrangement, and a mesh-type lattice structure.

In some aspects, the reverse flow reactor can include some type of equipment or method to direct a flow stream of one of the reactants into a selected portion of the conduits. In the exemplary embodiment of FIG. 2, a gas distributor 31 can direct a second gas stream 32 to second gas stream channels that are substantially isolated from or not in fluid communication with the first gas channels, here illustrated as channels 33. The result can be that at least a portion of gas stream 33 is kept separate from gas stream 30 during axial transit of the recuperator 27. In some aspects, the regenerative bed(s) and/or monolith(s) of the recuperator zone can comprise channels having a gas or fluid barrier that isolates the first reactant channels from the second reactant channels. Thereby, both of the at least two reactant gases that transit the channel means may fully transit the regenerative bed(s), to quench the regenerative bed, absorb heat into the reactant gases, before combining to react with each other in the combustion zone.

In various aspects, gases (including fluids) 30 and 32 can each comprise a component that reacts with a component in the other reactant 30 and 32, to produce an exothermic reaction when combined. For example, each of the first and second reactant may comprise one of a fuel gas and an oxidant gas that combust or burn when combined with the other of the fuel and oxidant. By keeping the reactants substantially separated, the location of the heat release that occurs due to exothermic reaction can be controlled. In some aspects "substantially separated" can be defined to mean that at least 50 percent, or at least 75 percent, or at least 90 percent of the reactant having the smallest or limiting stoichiometrically reactable amount of reactant, as between the first and second reactant streams, has not become consumed by reaction by the point at which these gases have completed their axial transit of the recuperator 27. In this manner, the majority of the first reactant 30 can be kept isolated from the majority of the second reactant 32, and the majority of the heat release from the reaction of combining reactants 30 and 32 can take place after the reactants begin exiting the recuperator 27. The reactants can be gases, but optionally some reactants may comprise a liquid, mixture, or vapor phase.

The percent reaction for these regeneration streams is meant the percent of reaction that is possible based on the stoichiometry of the overall feed. For example, if gas 30 comprised 100 volumes of air (80 volumes $N_2$ and 20 Volumes $O_2$), and gas 32 comprised 10 volumes of hydrogen, then the maximum stoichiometric reaction would be the combustion of 10 volumes of hydrogen ($H_2$) with 5 volumes of oxygen ($O_2$) to make 10 volumes of $H_2O$. In this case, if 10 volumes of hydrogen were actually combusted in the recuperator zone (27), this would represent 100% reaction of the regeneration stream. This is despite the presence of residual un-reacted oxygen, because in this example the un-reacted oxygen was present in amounts above the stoichiometric requirement. Thus, in this example the hydrogen is the stoichiometrically limiting component. Using this definition, less than 50% reaction, or less than 25% reaction, or less than 10% reaction of the regeneration streams can occur during the axial transit of the recuperator (27).

In various aspects, channels 28 and 33 can comprise ceramic (including zirconia), alumina, or other refractory material capable of withstanding temperatures exceeding 1200° C., or 1400° C., or 1600° C. Additionally or alternately, channels 28 and 33 can have a wetted area between 50 ft$^{-1}$ and 3000 ft$^{-1}$, or between 100 ft$^{-1}$ and 2500 ft$^{-1}$, or between 200 ft$^{-1}$ and 2000 ft$^{-1}$.

Referring again briefly to FIG. 1, the reactor system can includes a first reactor 7 containing a first end 9 and a second end 11, and a second reactor 1 containing a primary end 3 and a secondary end 5. The embodiments illustrated in FIGS. 1 and 2 are merely simple illustrations provided for explanatory purposes only and are not intended to represent a comprehensive embodiment. Reference made to an "end" of a reactor merely refers to a distal portion of the reactor with respect to an axial mid-point of the reactor. Thus, to say that a gas enters or exits an "end" of the reactor, such as end 9, means merely that the gas may enter or exit substantially at any of the various points along an axis between the respective end face of the reactor and a mid-point of the reactor, but more preferably closer to the end face than to the mid-point. Thereby, one or both of the first and second reactant gases could enter at the respective end face, while the other is supplied to that respective end of the reactor through slots or ports in the circumferential or perimeter outer surface on the respective end of the reactor.

EXAMPLE 1A—PREPARATION OF CERAMIC MONOLITH WITH CATALYTIC ACTIVITY FOR REFORMING

Ceramic monoliths have a size of 1.0 inch (~2.5 cm) long×0.5 inch (~1.3 cm) diameter were extruded at temperatures of 1300° C. and 1400° C. The monoliths were composed of 25 wt % nickel oxide (NiO) and 75 wt % alumina, titania, and bentonite. The extruded monoliths had a 400 cpsi (cells per square inch) and an open frontal area of either 35% or 52%. The monoliths included a weight ratio of alumina to nickel oxide of roughly 3.0. Nominally, the monoliths were composed of 22.1% NiO, 67.8% Al$_2$O$_3$, 8.4% SiO$_2$, 0.1% Fe$_2$O$_3$, 0.3% CaO, 0.2% MgO, <0.1% K$_2$O/Na$_2$O, and 1.0% TiO$_2$ as measured by x-ray fluorescence (XRF). The NiAl$_2$O$_4$ monolith was sintered at 1400° C., which resulted in a 8.3 wt % water absorption.

Table 1 shows a comparison of the properties of the NiAl$_2$O$_4$ ceramic monoliths with monoliths formed from either α-Al$_2$O$_3$ or NiO. As shown in Table 1, the NiAl$_2$O$_4$ monoliths provide a higher volumetric heat capacity than an α-Al$_2$O$_3$ having a similar open frontal area. In Table 1, OFA refers to open frontal area; $C_P$ is the heat capacity at room temperature (~20° C.), and VHC is the volumetric heat capacity at room temperature.

TABLE 1

Monolith Properties

| Material | OFA | Porosity | Density (g/cm$^3$) | $C_P$ (J/g/K) | VHC (J/cm$^3$) |
|---|---|---|---|---|---|
| α-Al$_2$O$_3$ | 55% | 30% | 3.9 | 0.78 | 0.96 |
| α-Al$_2$O$_3$ | 55% | 0% | 3.9 | 0.78 | 1.37 |
| α-Al$_2$O$_3$ | 35% | 0% | 3.9 | 0.78 | 1.98 |

TABLE 1-continued

Monolith Properties

| Material | OFA | Porosity | Density (g/cm$^3$) | $C_P$ (J/g/K) | VHC (J/cm$^3$) |
|---|---|---|---|---|---|
| NiO | 35% | 0% | 6.7 | 0.68 | 2.96 |
| 25 wt % NiO/75 wt % α-Al$_2$O$_3$ | 35% | 0% | | | 2.23 |
| 25 wt % NiO/75 wt % α-Al$_2$O$_3$ | 52% | 8.3% | | | 1.51 |

EXAMPLE 1B

Characterization of Ceramic Monolith

Figure 3:
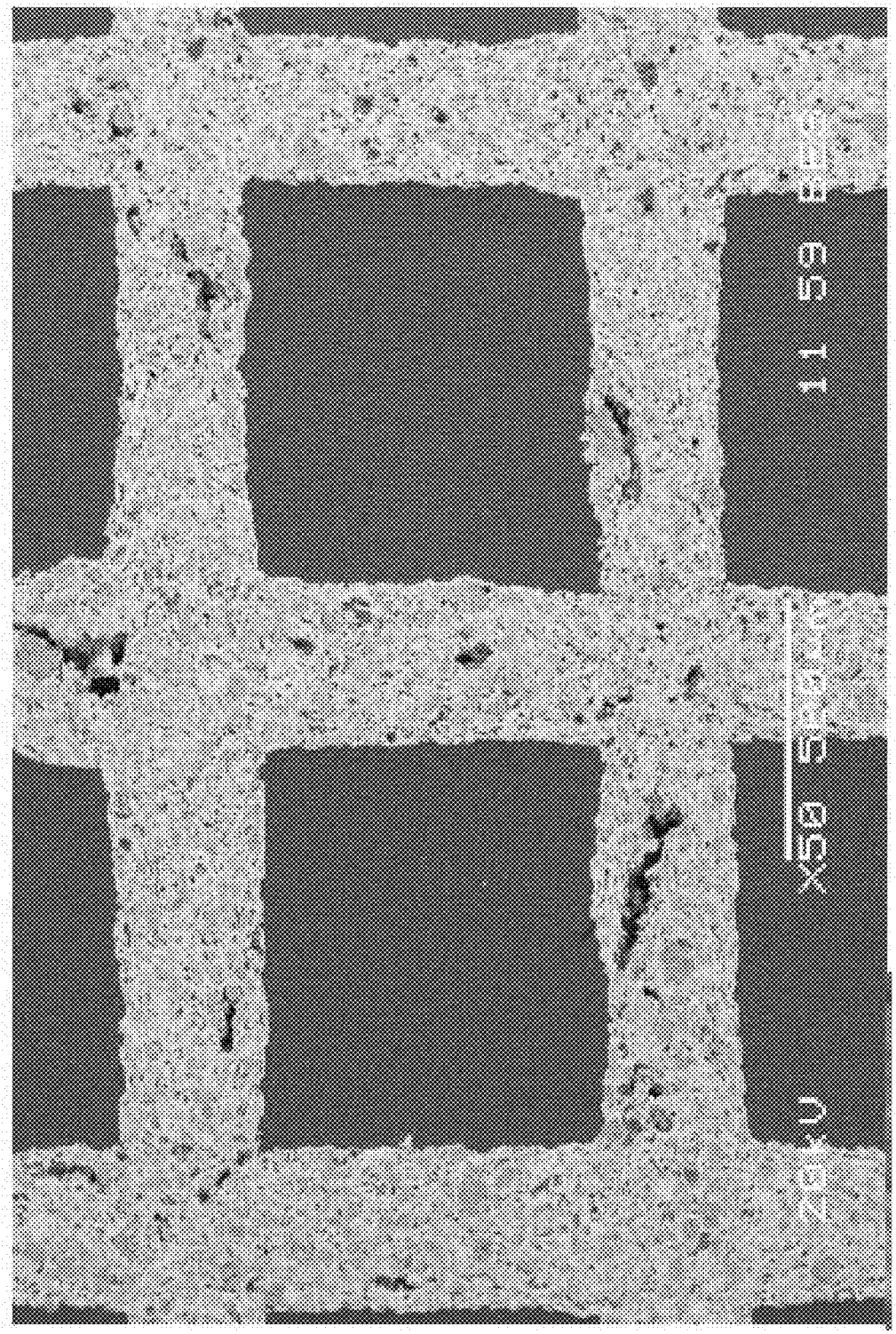
FIG. 3 shows an SEM image of a ceramic honeycomb monolith composed of a dopant oxide (NiO) and one or more structural oxides (including $Al_2O_3$).

The ceramic monolith sintered at 1400° C. with an open frontal area of 52% was further characterized prior to evaluation of the monolith for reforming activity. FIG. 3 shows an SEM image at a first magnification level (50×) that shows details regarding the wall structure between the cells of the monolith. The SEM image in FIG. 3 shows that the ceramic material has some porosity.

Figure 4:
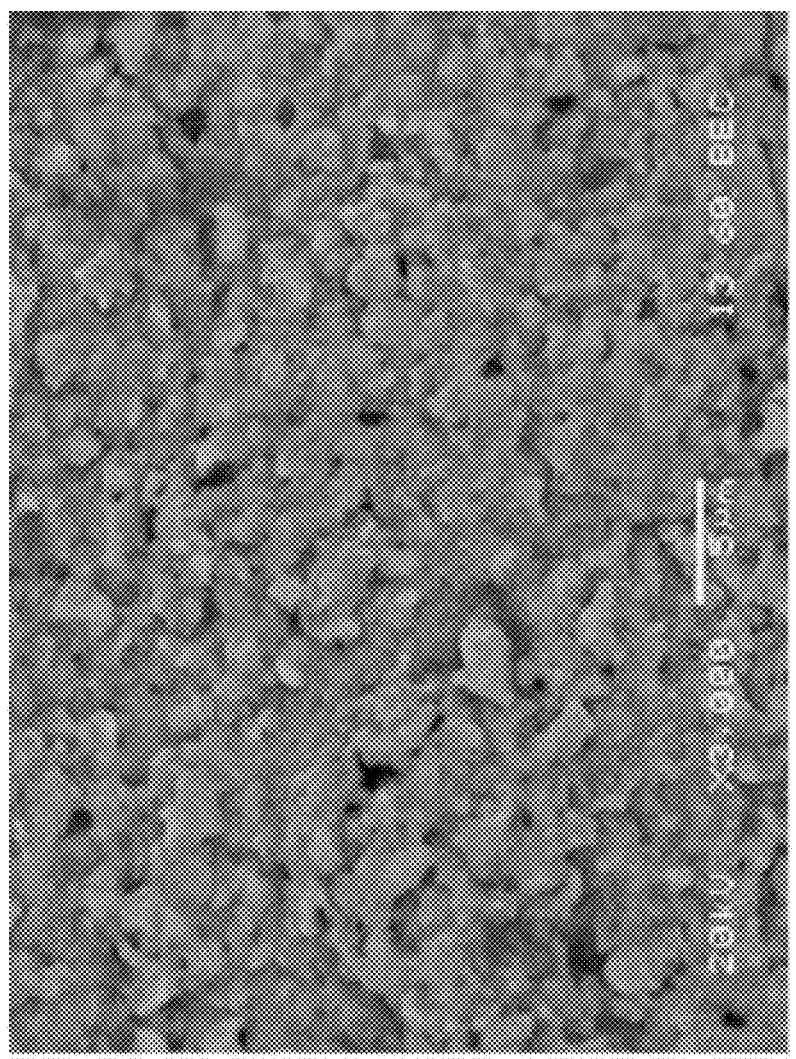
FIG. 4 shows an SEM image of a portion of the honeycomb monolith at higher magnification.
Figure 5:
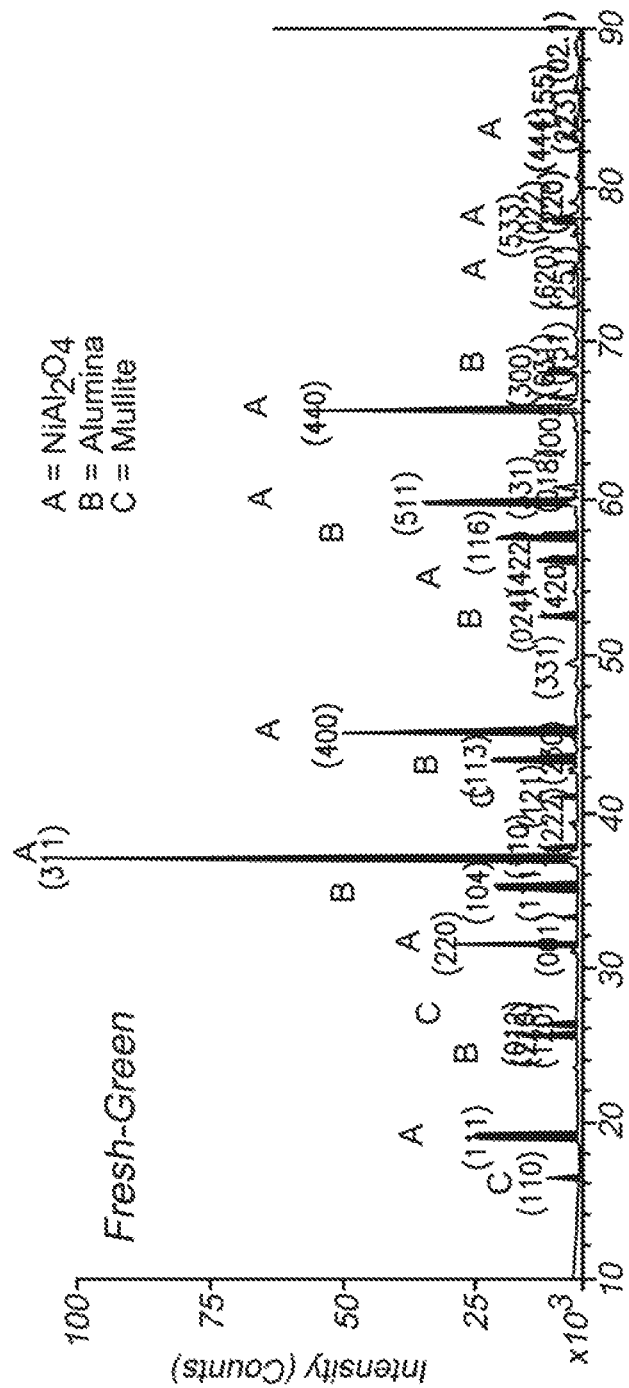
FIG. 5 shows an X-ray diffraction spectrum obtained on the portion of the honeycomb monolith shown in FIG. 4.

FIG. 4 shows an SEM image at a higher magnification level (3000×) that shows additional details regarding the surface structure of a honeycomb wall between the cells of the ceramic material. As shown in FIG. 4, the surface of the wall appears to be composed of a large number of grains or particles, as opposed to having a larger scale crystalline structure. This is believed to be due to the honeycomb wall being composed of several distinct phases of materials. This can be further seen in FIG. 5, which shows an X-ray diffraction characterization of the portion of the honeycomb wall shown in FIG. 4. As shown in FIG. 5, the honeycomb wall is composed of both NiAl$_2$O$_4$ (peaks designated as "A") as well as leftover alumina ("B") and mullite ("C"). The alumina and mullite phases are present because the ceramic composition includes a molar excess of alumina relative to the stoichiometric amount of alumina needed to form a solid nickel aluminate structure. The sample contains a molar ratio of 4.5 Al:Ni while a pure nickel aluminate structure has a molar ratio of 2:1. As a result, the sintered ceramic structure includes a substantial amount of alumina that is distinct from the nickel aluminate. The mullite is believed to be primarily formed by a reaction between silicate in bentonite and alumina during high temperature sintering. After sintering and prior to exposure to a reforming environment, the monolith is composed of 58% NiAl$_2$O$_4$, 21% Al$_2$O$_3$, and 21% mullite.

EXAMPLES 2 to 11

Activity of Ceramic Monolith for Reforming

The performance of the ceramic monolith from Example 1 was evaluated for methane reforming with both steam and carbon dioxide in a lab scale fixed-bed, down-flow reactor. The 1.0 inch (~2.5 cm)×0.5 inch (~1.3 cm) monolith was wrapped in a high temperature alumina cloth to prevent bypassing and loaded into a quartz reactor with an inlet diameter of approximately 0.6 inches (~1.5 cm). The space velocities were calculated based on the monolith as if the monolith was a solid cylinder. A thermocouple was located directly above the top of and directly below the bottom of the catalytic monolith. The methane and carbon dioxide conversion was determined by the disappearance of the reactant. The syngas ratio was calculated as the molar ratio of $H_2$ and CO in the products. All conversion for continuous flow experiments are reported after 1 hour of lineout. All cycle conversions are reported after 100 cycles at that temperature except when specifically stated. The nitrogen included in each run is used as an internal standard for gas chromatograph analysis. Table 2 shows the conditions and results corresponding to Examples 2-11.

(oven set temperatures) are shown and the conversion increases slightly with increasing temperature (Examples 8-10). When the monolith is returned to the identical 800° C. dry reforming cycling condition (Example 11), the conversion remains constant. Thus, the catalytic monolith was activated by the exposure to oxidative conditions and achieved significantly higher conversion than before its exposure to oxygen.

TABLE 2

Reforming Activity of Monolith

| Example | Cycling | Type of Reforming ($H_2O + CO_2:CH_4$) | GHSV ($h^{-1} \times 10^{-3}$) | Temperature (° C.) | $CH_4$ Conversion | $H_2/CO$ |
|---|---|---|---|---|---|---|
| 2 | N | Bi (1.1:1) | 10 | 800 | 0% | |
| 3 | N | Bi (1.1:1) | 20 | 800 | 0% | |
| 4 | N | Bi (1.1:1) | 20 | 900 | 11% | 2.4 |
| 5 | N | Bi (1.1:1) | 20 | 1000 | 25% | 2.3 |
| 6 | N | Bi (1.1:1) | 10 | 800 | 45% | 2.2 |
| 7 | N | Bi (1.1:1) | 20 | 800 | 21% | 2.3 |
| 8 | Y | Dry (1.1:1) | 20 | 800 | 34% | 0.6 |
| 9 | Y | Dry (1.1:1) | 20 | 900 | 46% | 0.7 |
| 10 | Y | Dry (1.1:1) | 20 | 1000 | 60% | 0.8 |
| 11 | Y | Dry (1.1:1) | 20 | 800 | 35% | 0.6 |

Examples 2 and 3 show the initial experiments on the monolith, which had 400 cells per square inch (cpsi) and was composed of 25 wt % NiO and 75% bentonite. The simultaneous reforming of methane and carbon dioxide (bi-reforming) was performed on the catalytic monolith with a space velocity of either 10,000 $hr^{-1}$ (Example 2) or 20,000 $hr^{-1}$ (Example 3) based on total monolith volume and a gas composition of 42.9% $CH_4$, 31.4% $H_2O$, 15.7% $CO_2$, and 10% Nz. At a temperature of 800° C. and space velocity of 20,000 $hr^{-1}$, the monolith had no appreciable conversion after 60 min of TOS. While a small amount of hydrogen was observed at the start of reaction, there was no quantifiable production of CO. Without being bound by any particular theory, it is believed that any catalytic sites that were exposed at 800° C. to the bi-reforming feed to likely coked immediately and became in-active for the methane reforming reaction. Between the 800° C. and 900° C. experiments (i.e., between Example 3 and Example 4), and after each subsequent condition change (i.e., between each subsequent example number), the monolith was exposed to a flow of 5% $O_2/N_2$ for 10 min. After exposure to the oxygen, the monolith was catalytically active at 900° C. (Example 4) and 1000° C. (Example 5) with a conversion of 11 wt % and 25 wt % of the methane in the feed, respectively. Upon revisiting the 800° C. conditions at identical flow rates (Examples 6 and 7), the monolith had catalytic activity with significant methane conversion in stark contrast to the lack of catalytic activity at the beginning of Example 2 or Example 3.

Example 8 shows an experiment for the cycling dry reforming of methane with carbon dioxide at a space velocity of 20,000 $h^{-1}$ and a gas composition of 43.1% $CH_4$, 46.9% $CO_2$, and 10% Nz. The cycling dry reforming experiments include an extra step where the feed is introduced for 1 min followed by a 7 sec nitrogen purge and then a 5% $O_2/N_2$ feed is introduced for 1 min followed by an additional 7 sec nitrogen purge. This cycle is repeated for about 100 cycles to line out the conversion except when noted. Results for cycling dry reforming at 800° C., 900° C., and 1000° C.

EXAMPLE 12

Additional Analysis of Example Reforming Results

Figure 6:
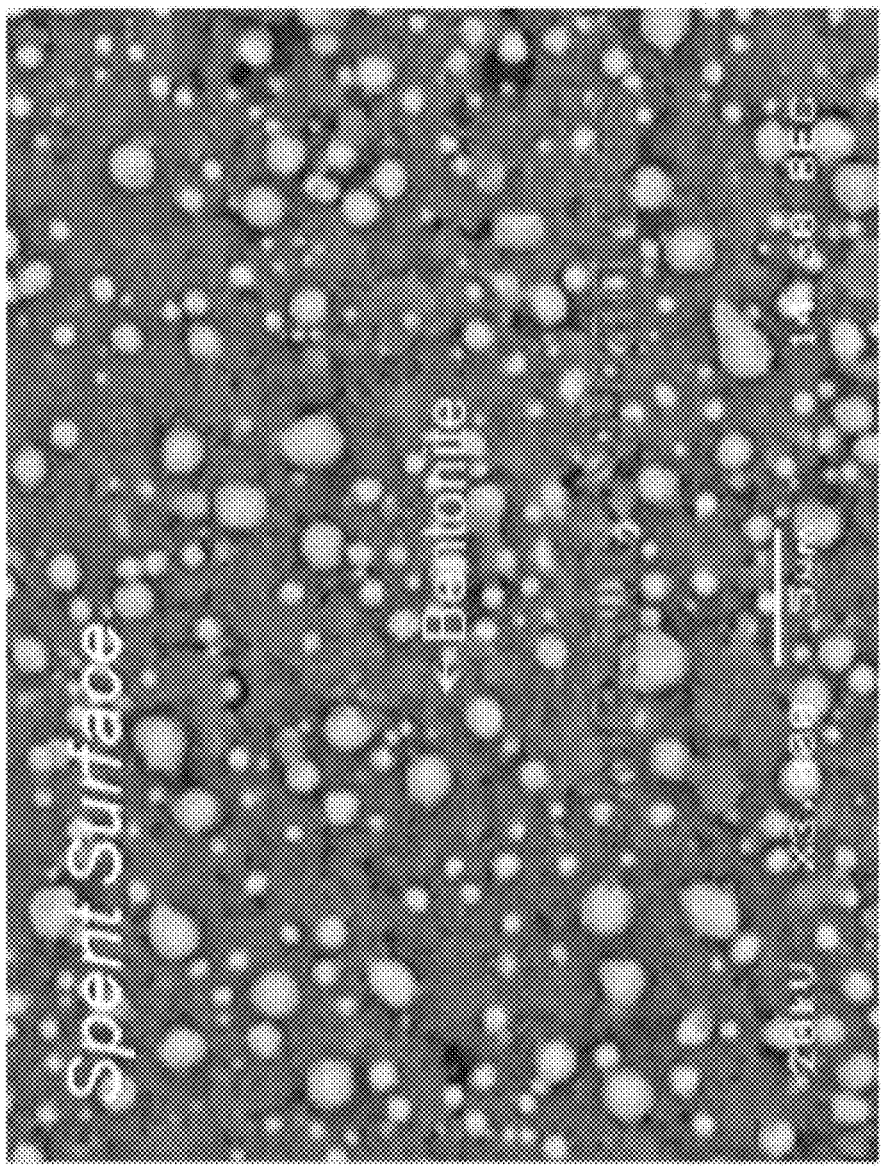
FIG. 6 shows an SEM image of a portion of the honeycomb monolith after exposure to a cyclic reaction environment.
Figure 7:
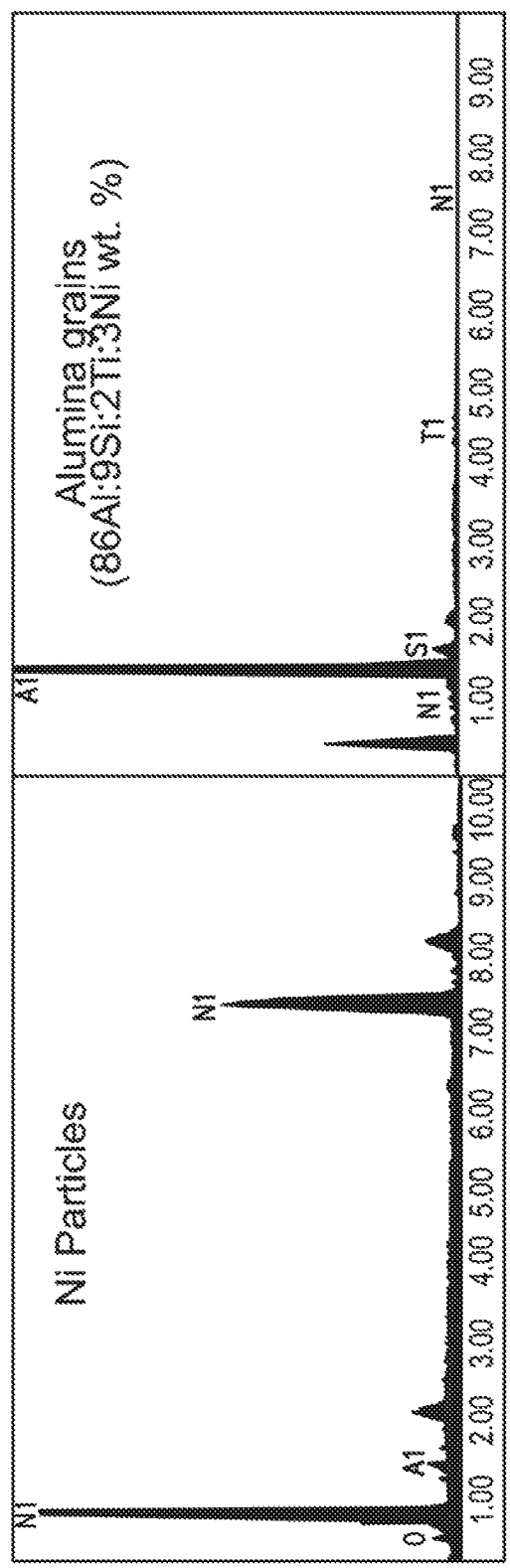
FIG. 7 shows an Energy dispersive X-ray spectroscopy spectrum of the honeycomb monolith shown in FIG. 6.

The nature of the in-situ catalytic activity of the combined nickel oxide, alumina, titania and bentonite ceramic monolith was investigated by characterizing the monolith after the final reforming process (Example 11). The ceramic monolith was not exposed to an oxidizing environment after Example 11. SEM images were obtained of the post-reducing environment monolith. The SEM images of the monolith prior to exposure to the cyclic reaction environment, as shown in FIG. 4, and after exposure to the cyclic reaction environment, as shown in FIG. 6, show a remarked difference in appearance. The monolith surface in FIG. 4 is characterized by a nickel aluminate spinel with additional alumina and mullite regions. By contrast, after exposure to the cyclic reaction environment, the resulting surface shown in FIG. 6 includes a mixture of alumina, mullite that is primarily formed by a reaction between silicate in bentonite and alumina, and fine metallic nickel nanoparticles. The presence of the nickel particles is confirmed by the energy dispersive X-ray spectroscopy spectrum shown in FIG. 7, which shows the presence of both metallic nickel and alumina.

The production of the nickel nanoparticles is unexpected from the nickel aluminate spinel phase that was produced by calcination at 1400° C. More generally, it is unexpected that the surface of a ceramic including a dopant oxide can be converted to a surface including dopant metal particles, even though the ceramic has previously been calcined and/or sintered at temperatures of 500° C. or more, or 800° C. or more, or 1000° C. or more. It is also unexpected that the monolith substantially retains its shape/structure after conversion from nickel aluminate to nickel supported on alumina. Without being bound by any particular theory, the dispersed nickel nanoparticles on the ceramic monoliths are believed to be responsible for the catalytic activity of the ceramic monolith. The dispersed nickel particles can correspond to nickel particles formed after the initial reducing step, or nickel particles formed during any subsequent reducing step in the cyclic reaction environment. The ability to form nickel particles in-situ avoids the need to washcoat the monolith with an alternative metal, but an additional metal, such as rhodium, may optionally be added to increase catalytic activity. After exposure to the cyclic reaction environment, the monolith is composed of 18% Ni, 60% $Al_2O_3$, and 22% mullite.

Figure 8:
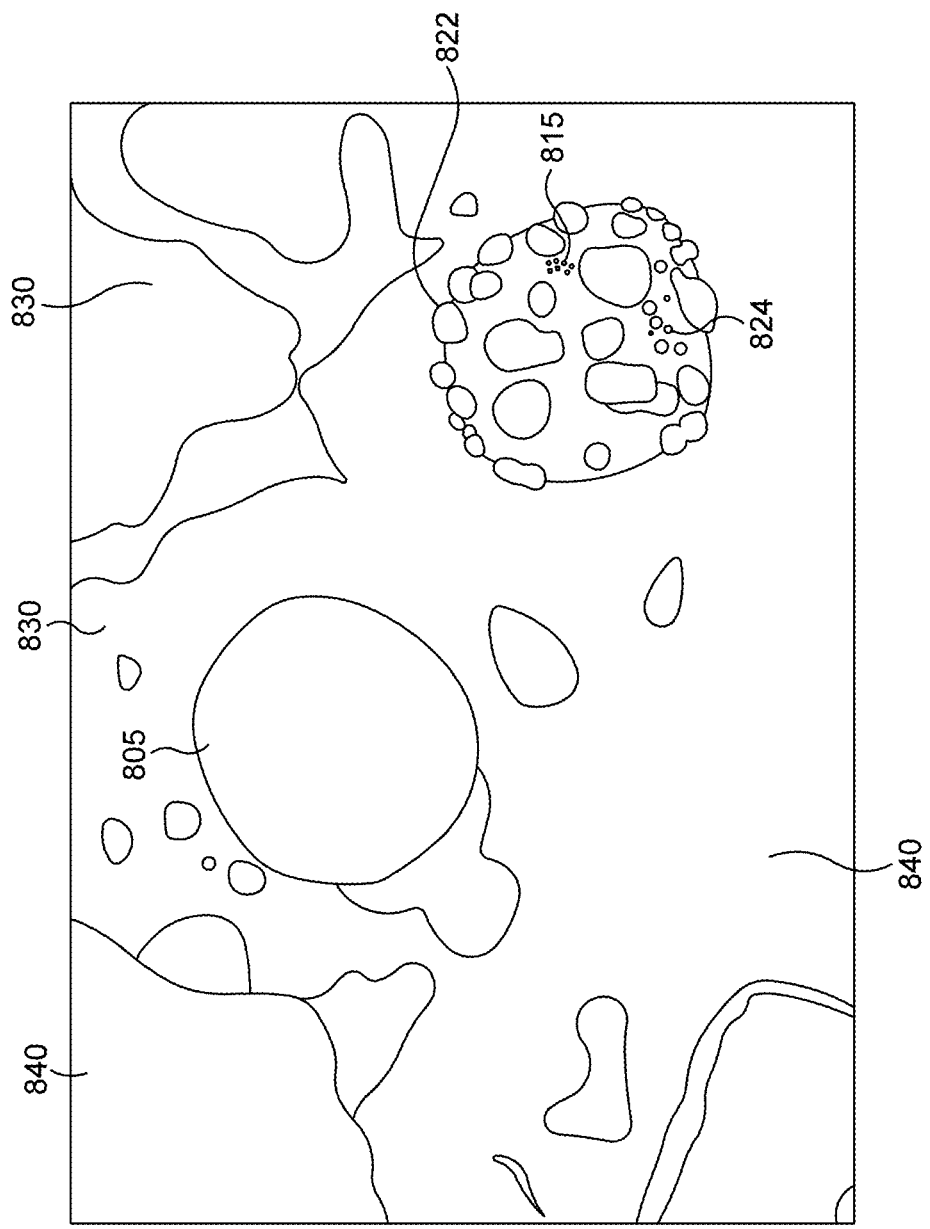
FIG. 8 shows a transmission electron microscope (TEM) image of another portion of the honeycomb monolith after exposure to a cyclic reaction environment.

FIG. 8 shows an illustration created based on data from a transmission electron microscope (TEM) image at a still higher level of magnification. The illustration in FIG. 8 is based on an SEM image from another region of the same monolith shown in FIGS. 4 and 6. In FIG. 8, in addition to showing a Ni particle 805 on a surface including both alumina 830 and mullite 840 phases, a second particle 815 including a variety of phases is also present. The core of the second particle 815 is composed of a combination of alumina and nickel aluminate, with additional smaller particles on the surface. The variety of smaller particles on the surface of particle 815 correspond to both Ni metal particles 822 and Ni-deficient nickel aluminate ($Ni_{1-x}\ Al_2O_4$ particles) 824. Thus, at least some mixed oxide that includes dopant metal oxide is still present on the surface after activation of the catalyst and exposure to cyclic reducing and oxidizing conditions.

Additional Embodiments

Embodiment 1. A method for reforming a hydrocarbon-containing stream, comprising: exposing a hydrocarbon-containing stream to a catalyst composition in the presence of at least one of $H_2O$ and $CO_2$ under reforming conditions comprising a temperature of 500° C. or more to form a reformed product comprising $H_2$, the catalyst composition comprising 0.1 wt % or more of dopant metal particles supported on 50 wt % to 99 wt % of one or more structural oxides, the one or more dopant metals corresponding to dopant metal oxides having a Gibbs free energy of formation at 800° C. that is greater than a Gibbs free energy of formation at 800° C. for the one or more structural oxides by 200 kJ/mol or more, the particles of the one or more dopant metals having an average characteristic length of 10 um or less, the dopant metal oxide comprising an oxide of Ni, Rh, Ru, Pd, Pt, Ir, or a combination thereof; and exposing the catalyst composition to a stream comprising fuel and 0.1 vol % or more of 02 under combustion conditions to heat an environment for the catalytic composition to a temperature of 500° C. or more.

Embodiment 2. The method of Embodiment 1, wherein the method further comprises: exposing an initial composition comprising 0.1 wt % or more of at least one dopant metal oxide and 50 wt % to 99 wt % of the one or more structural oxides, to a reducing environment comprising a temperature of 500° C. to 1400° C. to form the catalyst composition comprising the dopant metal particles supported on the one or more structural oxides; and exposing the catalyst composition to an oxidizing environment comprising a temperature of 500° C. to 1400° C., the exposing the hydrocarbon-containing stream to the catalyst composition being performed after the exposing the catalyst composition to the oxidizing environment.

Embodiment 3. The method of Embodiment 2, a) wherein exposing the initial composition to the reducing environment comprises exposing the initial composition to a hydrocarbon-containing stream in the presence of at least one of $H_2O$ and $CO_2$ under reforming conditions comprising a temperature of 500° C. or more.

Embodiment 4. The method of Embodiment 2 or 3, wherein exposing the catalyst composition to an oxidizing environment comprises exposing the catalyst composition to a stream comprising 0.1 vol % or more of $O_2$ at a regeneration temperature of 500° C. or more for a regeneration time period.

Embodiment 5. The method of any of the above embodiments, wherein exposing the hydrocarbon-containing stream to the catalyst composition comprises: introducing a hydrocarbon-containing stream into a first end of a reactor comprising a monolith comprising the catalyst composition; and exposing the hydrocarbon-containing stream to the catalyst composition in the presence of at least one of $H_2O$ and $CO_2$ under reforming conditions comprising a temperature of 800° C. or more to form a reformed product comprising Hz.

Embodiment 6. The method of Embodiment 5, further comprising: withdrawing at least a portion of the reformed product from a first location different from the first end of the reactor; introducing a regeneration stream comprising fuel and a stream comprising $O_2$ into the reactor, at least a portion of the stream comprising fuel and/or the stream comprising $O_2$ being introduced into a second end of the reactor; combusting the stream comprising fuel and the stream comprising oxygen under combustion conditions to form a combustion product stream, the combustion product stream optionally comprising 0.1 vol % or more of $O_2$; exposing the combustion product stream to the catalyst composition to transfer heat to the catalyst composition; and withdrawing at least a portion of the combustion product stream from the reactor.

Embodiment 7. The method of Embodiment 5 or 6, wherein the hydrocarbon-containing stream is exposed to the catalyst composition in a reverse flow reactor.

Embodiment 8. The method of any of the above embodiments, wherein the catalyst composition further comprises an additional catalytic metal, the additional catalytic metal comprising Ni, Rh, Ru, Pd, Pt, Ir, or a combination thereof.

Embodiment 9. The method of any of the above embodiments, wherein the hydrocarbon-containing stream comprises 5 wt % or more $C_{2+}$ hydrocarbons, 40 wt % or more methane, or a combination thereof; or wherein the method further comprises periodically exposing the catalyst composition to an oxidizing stream comprising 0.1 vol % or more of $O_2$ at a temperature of 500° C. or more for an oxidizing time period; or a combination thereof.

Embodiment 10. The method of any of the above embodiments, wherein the dopant metal particles comprise 1.0 wt % or more of Ni particles, and wherein the one or more structural oxides comprise $Al_2O_3$.

Embodiment 11. The method of Embodiment 10, wherein the catalyst composition further comprises NiO, $NiAl_2O_4$, or a combination thereof.

Embodiment 12. The method of Embodiment 10 or 11, wherein the initial composition comprises 40 wt % or more $Al_2O_3$.

Embodiment 13. The method of any of the above embodiments, i) wherein the catalyst composition comprises a monolith having a cell density of more than 900 cells per square inch, ii) wherein the catalyst composition comprises a honeycomb monolith, iii) wherein the initial composition is formed by extrusion, or iv) a combination of two or more if i), ii), and iii).

Embodiment 14. The method of any of the above embodiments, wherein the catalyst composition comprises a volumetric heat capacity of 140 kJ/cm³ or more.

Embodiment 15. The method of any of the above embodiments, wherein the one or more structural oxides comprise at least one mixed structural oxide phase, or wherein the catalyst composition further comprises a mixed oxide phase including an oxide of the one or more dopant metals and at least one structural oxide.

While the present invention has been described and illustrated by reference to particular embodiments, those of ordinary skill in the art will appreciate that the invention lends itself to variations not necessarily illustrated herein. For this reason, then, reference should be made solely to the appended claims for purposes of determining the true scope of the present invention.

The invention claimed is:

1. A method for reforming a hydrocarbon-containing stream, comprising:
    exposing an initial ceramic composition comprising 0.1 wt % or more of at least one dopant metal oxide and 50 wt % to 99 wt % of one or more structural oxides, to a reducing environment comprising a temperature of 500° C. to 1400° C. to form a catalyst composition comprising dopant metal particles supported on the one or more structural oxides, the one or more dopant metals corresponding to dopant metal oxides having a Gibbs free energy of formation at 800° C. that is greater than a Gibbs free energy of formation at 800° C. for the one or more structural oxides by 200 kJ/mol or more, the particles of the one or more dopant metals having an average characteristic length of 10 μm or less, the dopant metal oxide comprising an oxide of Rh, Ru, Pd, Pt, Ir, or a combination thereof;
    exposing the catalyst composition to an oxidizing environment comprising a temperature of 500° C. to 1400° C.;
    exposing a hydrocarbon-containing stream to the catalyst composition in the presence of at least one of $H_2O$ and $CO_2$ under reforming conditions comprising a temperature of 500° C. or more to form a reformed product comprising $H_2$, the exposing the hydrocarbon-containing stream to the catalyst composition being performed after the exposing the catalyst composition to the oxidizing environment; and
    exposing the catalyst composition to a stream comprising fuel and 0.1 vol % or more of $O_2$ under combustion conditions to heat an environment for the catalytic composition to a temperature of 500° C. or more.

2. The method of claim 1, wherein the one or more structural oxides comprise at least one mixed structural oxide phase.

3. The method of claim 1, wherein the catalyst composition further comprises a mixed oxide phase including an oxide of the one or more dopant metals and at least one structural oxide.

4. A method for reforming a hydrocarbon-containing stream, comprising:
    exposing an initial ceramic composition comprising 1.0 wt % or more of Ni in an oxide form and 50 wt % to 99 wt % of one or more structural oxides, the one or more structural oxides comprising $Al_2O_3$, to a reducing environment comprising a temperature of 500° C. to 1400° C. to form a catalyst composition comprising Ni particles supported on $Al_2O_3$;
    exposing the catalyst composition to an oxidizing environment comprising a temperature of 500° C. to 1400° C.;
    exposing a hydrocarbon-containing stream to the catalyst composition in the presence of at least one of $H_2O$ and $CO_2$ under reforming conditions comprising a temperature of 800° C. or more to form a reformed product comprising $H_2$, the exposing the hydrocarbon-containing stream to the catalyst composition being performed after the exposing the catalyst composition to the oxidizing environment; and
    exposing the catalyst composition to a stream comprising fuel and 0.1 vol % or more of $O_2$ under combustion conditions to heat an environment for the catalyst catalytic composition to a temperature of 800° C. or more.

5. The method of claim 4, wherein exposing the initial ceramic composition to the reducing environment comprises exposing the initial ceramic composition to a hydrocarbon-containing stream in the presence of at least one of $H_2O$ and $CO_2$ under reforming conditions comprising a temperature of 500° C. or more.

6. The method of claim 4, wherein exposing the catalyst composition to an oxidizing environment comprises exposing the catalyst composition to a stream comprising 0.1 vol % or more of $O_2$ at a regeneration temperature of 500° C. or more for a regeneration time period.

7. The method of claim 4, i) wherein the catalyst composition comprises a monolith having a cell density of more than 900 cells per square inch, ii) wherein the catalyst composition comprises a honeycomb monolith, iii) wherein the initial composition is formed by extrusion, or iv) a combination of two or more if i), ii), and iii).

8. The method of claim 4, wherein the catalyst composition comprises a volumetric heat capacity of 140 kJ/cm³ or more.

9. The method of claim 4, wherein the catalyst composition further comprises NiO, $NiAl_2O_4$, or a combination thereof.

10. The method of claim 4, wherein the initial ceramic composition comprises 40 wt % or more $Al_2O_3$.

11. The method of claim 4, wherein the initial ceramic composition comprises an initial ceramic composition sintered at a temperature of 1200° C. or higher.

12. A method for reforming a hydrocarbon-containing stream, comprising:
    performing a cyclic reforming process, the cyclic reforming process comprising:
    introducing a hydrocarbon-containing stream into a first end of a reactor comprising a monolith comprising a catalyst composition, the catalyst composition comprising 0.1 wt % or more of dopant metal particles supported on 50 wt % to 99 wt % of one or more structural oxides, the one or more dopant metals corresponding to dopant metal oxides having a Gibbs free energy of formation at 800° C. that is greater than a Gibbs free energy of formation at 800° C. for the one or more structural oxides by 200 kJ/mol or more, the particles of the one or more dopant metals having an average characteristic length of 10 μm or less, the dopant metal oxide comprising an oxide of Rh, Ru, Pd, Pt, Ir, or a combination thereof;
    exposing the hydrocarbon-containing stream to the catalyst composition in the presence of at least one of $H_2O$ and $CO_2$ under reforming conditions comprising a temperature of 800° C. or more to form a reformed product comprising $H_2$;
    withdrawing at least a portion of the reformed product from a first location different from the first end of the reactor;
    introducing a regeneration stream comprising fuel and a stream comprising $O_2$ into the reactor, at least a portion of the stream comprising fuel, at least a portion of the stream comprising $O_2$, or a combination thereof being introduced into a second end of the reactor;

combusting the stream comprising fuel and the stream comprising oxygen under combustion conditions to form a combustion product stream;

exposing the combustion product stream to the catalyst composition to transfer heat to the catalyst composition; and withdrawing at least a portion of the combustion product stream from the reactor.

13. The method of claim 12, wherein the catalyst composition further comprises a mixed oxide phase including an oxide of the one or more dopant metals and at least one structural oxide.

14. A method for reforming a hydrocarbon-containing stream, comprising:

performing a cyclic reforming process, the cyclic reforming process comprising:

introducing a hydrocarbon-containing stream into a first end of a reactor comprising a monolith comprising a catalyst composition, the catalyst composition comprising 1.0 wt % or more of Ni particles, NiO, $NiAl_2O_4$, or a combination thereof, supported on 50 wt % to 99 wt % of one or more structural oxides, the one or more structural oxides comprising $Al_2O_3$;

exposing the hydrocarbon-containing stream to the catalyst composition in the presence of at least one of $H_2O$ and $CO_2$ under reforming conditions comprising a peak temperature of 800° C. or more to form a reformed product comprising $H_2$;

withdrawing at least a portion of the reformed product from a first location different from the first end of the reactor;

introducing a regeneration stream comprising fuel and a stream comprising $O_2$ into the reactor, at least a portion of the stream comprising fuel and/or the stream comprising $O_2$ being introduced into a second end of the reactor;

combusting the stream comprising fuel and the stream comprising oxygen under combustion conditions to form a combustion product stream;

exposing the combustion product stream to the catalyst composition to transfer heat to the catalytic composition, at least a portion of the catalyst composition being heated to a peak temperature of 1000° C. or higher; and withdrawing at least a portion of the combustion product stream from the reactor.

15. The method of claim 14, wherein the hydrocarbon-containing stream is exposed to the catalyst composition in a reverse flow reactor.

16. The method of claim 15, wherein the hydrocarbon-containing stream comprises 5 wt % or more $C_{2+}$ hydrocarbons, 40 wt % or more methane, or a combination thereof.

17. The method of claim 15, wherein the catalyst composition further comprises an additional catalytic metal, the additional catalytic metal comprising Rh, Ru, Pd, Pt, Ir, or a combination thereof.

18. The method of claim 14, wherein the combustion product stream comprises 0.1 vol % or more of $O_2$., the combustion product stream being exposed to the catalyst composition under conditions that comprise a temperature of 500° C. or more.

19. The method of claim 14, wherein the method further comprises periodically exposing the catalyst composition to an oxidizing stream comprising 0.1 vol % or more of $O_2$ at a temperature of 500° C. or more for an oxidizing time period.

20. The method of claim 14, wherein the reforming conditions comprise a peak temperature in a reforming zone of 1000° C. or higher.

* * * * *